United States Patent
Desanti et al.

(10) Patent No.: US 12,307,129 B2
(45) Date of Patent: *May 20, 2025

(54) SYSTEMS AND METHODS FOR COMMAND EXECUTION REQUEST FOR PULL MODEL DEVICES

(71) Applicant: DELL PRODUCTS L.P., Round Rock, TX (US)

(72) Inventors: Claudio Desanti, Santa Cruz, CA (US); Erik Smith, Douglas, MA (US); Pawan Kumar Singal, Milpitas, CA (US); Sakti Lakshmiy R Paulchamy, Chennai (IN)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/863,277

(22) Filed: Jul. 12, 2022

(65) Prior Publication Data

US 2024/0020055 A1 Jan. 18, 2024

(51) Int. Cl.
*G06F 3/06* (2006.01)

(52) U.S. Cl.
CPC ......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | |
|---|---|---|
| 6,625,625 B1 | 9/2003 | Kihara |
| 7,185,334 B2 | 2/2007 | Bourke-Dunphy |
| 7,697,920 B1 | 4/2010 | McClain |
| 8,375,014 B1 | 2/2013 | Brocato |
| 9,384,093 B1 | 7/2016 | Aiello |
| 9,516,108 B1 | 12/2016 | Sullivan |
| 10,225,138 B2 | 3/2019 | Wu |
| 10,372,926 B1 | 8/2019 | Leshinsky |
| 10,771,340 B2 | 9/2020 | Ballapuram |
| 10,877,669 B1 | 12/2020 | Sivasubramanian |
| 11,323,355 B1 | 5/2022 | Gupta |
| 11,442,652 B1 | 9/2022 | Dailey |
| 11,451,470 B2 | 9/2022 | Power |
| 11,487,690 B2 | 11/2022 | Puttagunta |
| 11,489,723 B2 | 11/2022 | Smith |
| 11,520,518 B2 | 12/2022 | Desanti |
| 11,543,966 B1 | 1/2023 | Varghese |
| 11,550,734 B1 | 1/2023 | Matosevich |
| 11,579,808 B2 | 2/2023 | Satapathy |
| 11,614,970 B2 | 3/2023 | Huang |

(Continued)

OTHER PUBLICATIONS

Claudio DeSanti, "Subsystem Driven Zoning with Pull Registration Model," nvm Express, Feb. 1, 2022. (8pgs).

(Continued)

*Primary Examiner* — Kaushikkumar M Patel
(74) *Attorney, Agent, or Firm* — BAUGH LAW, LLC

(57) ABSTRACT

Embodiments presented herein enable non-volatile memory express (NVMe®) subsystem-driven command execution requests. By configuring subsystems as pull model devices, subsystems can request a centralized discovery controller to perform one or more operations. Embodiments may leverage a command execution request architecture to achieve the subsystem-driven pull model functionality.

20 Claims, 33 Drawing Sheets

(56) References Cited

U.S. PATENT DOCUMENTS

| | | |
|---|---|---|
| 11,625,273 B1 | 4/2023 | Elhemali |
| 11,675,499 B2 | 6/2023 | Dhatchinamoorthy |
| 11,805,171 B2 | 10/2023 | Smith |
| 11,818,031 B2 | 11/2023 | Smith |
| 11,822,545 B2 | 11/2023 | Cappiello |
| 11,907,530 B2 | 2/2024 | Desanti |
| 12,086,431 B1 | 9/2024 | Dreier |
| 12,105,989 B2 | 10/2024 | Desanti et al. |
| 2002/0016921 A1 | 2/2002 | Olsen |
| 2004/0097217 A1 | 5/2004 | McClain |
| 2006/0242320 A1 | 10/2006 | Nettle |
| 2007/0299880 A1 | 12/2007 | Kawabe |
| 2009/0225351 A1 | 9/2009 | Lacagnina |
| 2010/0199330 A1 | 8/2010 | Schott |
| 2012/0254554 A1 | 10/2012 | Nakajima |
| 2013/0297835 A1 | 11/2013 | Cho |
| 2015/0038076 A1 | 2/2015 | Naruse |
| 2016/0241659 A1 | 8/2016 | Wessendorf |
| 2017/0048322 A1 | 2/2017 | Desanti |
| 2018/0074717 A1 | 3/2018 | Olarig |
| 2018/0074984 A1 | 3/2018 | Olarig |
| 2018/0270119 A1 | 9/2018 | Ballapuram |
| 2019/0020603 A1 | 1/2019 | Subramani |
| 2019/0042144 A1 | 2/2019 | Peterson |
| 2019/0047841 A1 | 2/2019 | Chang |
| 2019/0245924 A1 | 8/2019 | Li |
| 2019/0318734 A1 | 10/2019 | Nair |
| 2019/0332766 A1 | 10/2019 | Guri |
| 2019/0334949 A1 | 10/2019 | Guri |
| 2020/0065269 A1 | 2/2020 | Balasubramani et al. |
| 2020/0081640 A1 | 3/2020 | Enz et al. |
| 2020/0136996 A1 | 4/2020 | Li |
| 2020/0310657 A1 | 10/2020 | Cayton et al. |
| 2020/0319812 A1 | 10/2020 | He et al. |
| 2020/0349094 A1 | 11/2020 | Smith et al. |
| 2020/0409893 A1 | 12/2020 | Puttagunta |
| 2021/0019272 A1 | 1/2021 | Olarig et al. |
| 2021/0028987 A1 | 1/2021 | Krivenok |
| 2021/0037105 A1 | 2/2021 | Smith-Denny |
| 2021/0064281 A1 | 3/2021 | Satapathy et al. |
| 2021/0124695 A1 | 4/2021 | Jaiswal et al. |
| 2021/0286540 A1 | 9/2021 | Tylik |
| 2021/0286741 A1 | 9/2021 | Smith |
| 2021/0286745 A1 | 9/2021 | Smith |
| 2021/0288878 A1 | 9/2021 | Smith |
| 2021/0289027 A1 | 9/2021 | Smith |
| 2021/0289029 A1 | 9/2021 | Smith |
| 2021/0311899 A1 | 10/2021 | Smith |
| 2021/0391988 A1 | 12/2021 | Bedau |
| 2021/0397351 A1 | 12/2021 | Dhatchinamoorthy |
| 2022/0014592 A1 | 1/2022 | Kachare |
| 2022/0027076 A1 | 1/2022 | Reichbach |
| 2022/0030062 A1 | 1/2022 | Jennings |
| 2022/0066799 A1 | 3/2022 | Pinto |
| 2022/0174094 A1 | 6/2022 | Subbiah et al. |
| 2022/0237274 A1 | 7/2022 | Paul |
| 2022/0286377 A1 | 9/2022 | Smith |
| 2022/0286508 A1 | 9/2022 | Smith |
| 2023/0035799 A1 | 2/2023 | Desanti |
| 2023/0305700 A1 | 9/2023 | Desanti |
| 2023/0325200 A1 | 10/2023 | Desanti |
| 2024/0020055 A1 | 1/2024 | Desanti |
| 2024/0020056 A1 | 1/2024 | Desanti |
| 2024/0020057 A1 | 1/2024 | Paulchamy |

OTHER PUBLICATIONS

Office Action received Oct. 26, 2023, in the related matter, U.S. Appl. No. 17/699,005. (10pgs).
Response filed Nov. 28, 2023, in the related matter, U.S. Appl. No. 17/699,005. (11pgs).
Notice of Allowance & Fee(s) Due received Jan. 8, 2024, in the related matter, U.S. Appl. No. 17/699,005. (10pgs).
Notice of Allowance & Fee(s) Due received Dec. 28, 2023, in the related matter, U.S. Appl. No. 17/865,244. (30pgs).
NVM Express TM over Fabrics , Revision 1.1 a, Jul. 12, 2021, [online], [Retrieved Jan. 12, 2024]. Retrieved from Internet <URL: https://nvmexpress.org/wp-content/uploads/NVMe-over-Fabrics-1.1a-2021.07.12-Ratified.pdf.> 2021. (84 pgs).
"NVMe-oF™: Discovery Automation for NVMe® IP-based SANs," SNIA NSF Networking Storage, Nov. 2021. (49pgs).
Office Action received Nov. 9, 2023, in the related matter, U.S. Appl. No. 17/863,300. (18pgs).
Notice of Allowance & Fee(s) Due received Apr. 29, 2024, in the related matter, U.S. Appl. No. 17/699,005. (11pgs).
Office Action received Mar. 6, 2024, in the related matter, U.S. Appl. No. 17/863,300. (23pgs).
Office Action received Mar. 14, 2024, in the related matter, U.S. Appl. No. 17/863,263. (25pgs).
Response filed Feb. 9, 2024, in the related matter, U.S. Appl. No. 17/863,300. (16pgs).
Response filed Jun. 7, 2024, in the related matter, U.S. Appl. No. 17/863,263. (16pgs).
Response filed Jun. 6, 2024, in the related matter, U.S. Appl. No. 17/863,300. (14pgs).
Final Office Action in the related matter, U.S. Appl. No. 17/863,300. (19pgs).
Response filed Sep. 3, 2024, in the related matter, U.S. Appl. No. 17/863,300. (12pgs).
Final Office Action mailed Sep. 12, 2024, in the related U.S. Appl. No. 17/863,263. (25 pgs).
Office Action mailed Oct. 24, 2024, in the related U.S. Appl. No. 17/863,300. (24 pgs).
Erik Smith "NVM Express Technical Proposal for New Feature," nvm Express, Dell EMC, Jan. 11, 2022. (9 pgs).
Erik Smith et al., "NVM Express Technical Proposal (TP) 8010," nvm Express, Jan. 12, 2022. (82 pgs).
Erik Smith et al., "NVM Express Technical Proposal (TP) 8010a," nvm Express, May 9, 2022. (80 pgs).
Notice of Allowance and Fee(s) Due, mailed Mar. 4, 2025, in the related matter, U.S. Appl. No. 17/863,300. (5pgs).
Response filed Jan. 24, 2025, in the related matter, U.S. Appl. No. 17/863,300. (12pgs).
"FC and FCoE versus iSCSI—"Network-centric" versus "End-Node-centric" provisioning," [online], [Retrieved Oct. 12, 2020]. Retrieved from Internet (6 pgs).
"Hard zoning versus soft zoning in a FC/FCoE SAN," [online], [Retrieved Oct. 12, 2020] Retrived from Internet (5 pgs).
"NVM Express Base Specification," revision 1.4, Jun. 10, 2019, [online], [Retrieved Oct. 12, 2020] Retrieved from Internet (403pgs).
"NVM Express Over Fabrics," revision 1.0, ratified May 31, 2016, [online], [Retrieved Oct. 12, 2020] Retrieved from Internet (49pgs).
"NVMe over Fabrics' Discovery problem," [online], [Retrieved Oct. 12, 2020] Retrieved from Internet (2pgs).
INCITS 548-2020, Information Technology—Fibre Channel—Generic Services—8 (FC-GS-8), American National Standard for Information Technology, 2020 (431).
Notice of Allowance & Fee(s) Due received Dec. 10, 2024, U.S. Appl. No. 17/863,277. (5 pgs).
Notice of Allowance & Fee(s) Due received Dec. 18, 2024, U.S. Appl. No. 17/863,863. (10 pgs).
Notice of Allowance & Fee(s) Due received Jun. 25, 2024, U.S. Appl. No. 17/863,277. (5 pgs).
NVM Express Over Fabrics, revision 1.1, Oct. 22, 2019, [online], [Retrieved Oct. 10, 2020] Retrieved from Internet <URL:https://nvmexpress.org> (83 pgs).
Office Action received Jan. 24, 2024, U.S. Appl. No. 17/863,277 (15pgs).
Response filed Apr. 9, 2024, U.S. Appl. No. 17/863,277. (14pgs).

200
GAPZ Request — 202
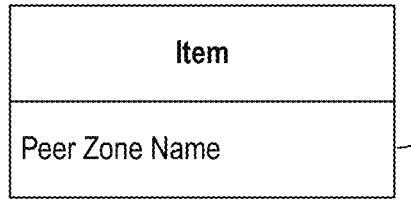
GAPZ Response — 210
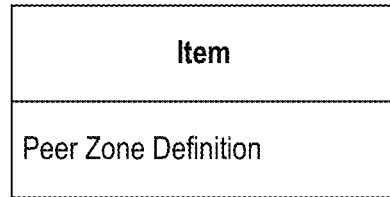
220
AAPZ Request — 222
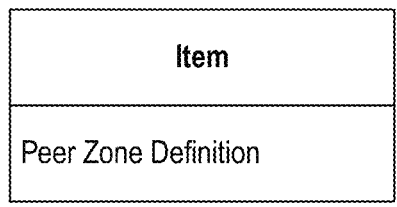
AAPZ Response — 230
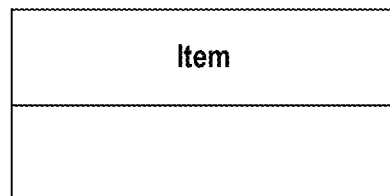
240
RAPZ Request — 242
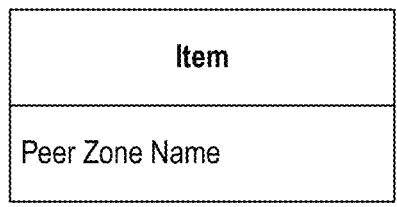
RAPZ Response — 250
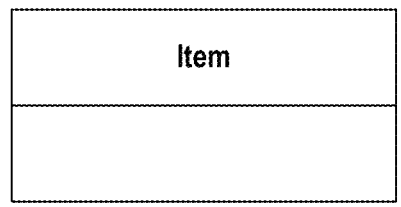
*Prior Art*
FIG. 2

| | ZoneGroup<br>{Florence, NQN(CDC)} | ZoneGroup<br>{Pisa, NQN(Storage3)} | | ZoneGroup<br>{Siena, NQN(CDC)} | |
|---|---|---|---|---|---|
| Zone Name | αβ | γδε | | φ | λ |
| Zone Members | {Host A, host} | {Host B, host} | | {Host E, host} | {Host A, host} |
| | {Storage 1, subsystem} | {Host C, host} | | {Storage 4, subsystem} | {Storage 4, subsystem} |
| | {Storage 2, subsystem} | {Host D, host} | | {Storage 5, subsystem} | |
| | | {Storage 3, subsystem} | | | |

```
┌─────────────────────────────────────────────────────────────┐
│ Send to a centralized discovery controller (CDC) a          │
│ notification (e.g., AEN) that indicates that the DDC wants  │──1605
│ an operation performed                                      │
└─────────────────────────────────────────────────────────────┘
                              │
                              ▼
┌─────────────────────────────────────────────────────────────┐
│ Responsive to receiving a request (e.g., GLP request) from  │
│ the CDC requesting what operation the DDC wants to be       │
│ performed, send a response (e.g., GLP response) to the CDC  │──1610
│ that specifies which operation the DDC wants performed and  │
│ one or more operation specific parameters associated with   │
│ the requested operation                                     │
└─────────────────────────────────────────────────────────────┘
                              │
                              ▼
┌─────────────────────────────────────────────────────────────┐
│ Receive from the CDC one or more messages related to the    │──1615
│ requested operation                                         │
└─────────────────────────────────────────────────────────────┘
```

```
┌─────────────────────────────────────────────────────┐
│ Responsive to a centralized discovery controller (CDC)│
│ receiving a notification (e.g., AEN) from a direct discovery│
│ controller (DDC) of a storage subsystem indicating that the DDC│──⌐ 3005
│ is a pull model DDC that is requesting the CDC to perform an│
│ operation, respond by sending a request (e.g., GLP) to the DDC│
│ requesting a Log Page Request (e.g., Pull DDC Request Log│
│ Page) that identifies an operation that the DDC wants│
│                     performed                        │
└─────────────────────────────────────────────────────┘
                           │
                           ▼
┌─────────────────────────────────────────────────────┐
│ Receive a response (e.g., a GLP response) from the DDC, in│
│ which the response is a Log Page requesting a Log Page│──⌐ 3010
│ Request operation and includes one or more operation specific│
│ parameters associated with the requested Log Page Request│
│                     operation                        │
└─────────────────────────────────────────────────────┘
                           │
                           ▼
┌─────────────────────────────────────────────────────┐
│ Perform one or more actions related to the operation (e.g., read│──⌐ 3015
│     the host discovery information from a datastore)│
└─────────────────────────────────────────────────────┘
                           │
                           ▼
┌─────────────────────────────────────────────────────┐
│ Issue a Send Log Page command to provide the requested Log│──⌐ 3020
│               Page to the DDC                        │
└─────────────────────────────────────────────────────┘
```

SYSTEMS AND METHODS FOR COMMAND EXECUTION REQUEST FOR PULL MODEL DEVICES

CROSS-REFERENCE TO RELATED APPLICATIONS

This patent application is related to co-pending and commonly-owned U.S. patent application Ser. No. 17/863,263, filed on 12 Jul. 2022, entitled "SYSTEMS AND METHODS FOR STORAGE SUBSYSTEM-DRIVEN ZONING FOR PULL MODEL DEVICES," and listing Claudio DeSanti as inventor, which patent document is incorporated by reference herein in its entirety and for all purposes.

This patent application is related to co-pending and commonly-owned U.S. patent application Ser. No. 17/863,300, filed on 12 Jul. 2022, entitled "SYSTEMS AND METHODS FOR SEND LOG PAGE COMMANDS FOR PULL MODEL DEVICES," and listing Claudio DeSanti, Erik Smith, David Black, Pawan Singal, and Sakti Lakshmiy R. Paulchamy as inventors, which patent document is incorporated by reference herein in its entirety and for all purposes.

BACKGROUND

A. Technical Field

The present disclosure relates generally to information handling system. More particularly, the present disclosure relates to zoning in a Storage Area Network (SAN).

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Changes in SAN-related technologies have included the development of NVMe®, which represents a set of specifications related to storage access that allows host systems to communicate with non-volatile memory storage, such as flash and solid-state drives across a number of transports (e.g., PCI Express, RDMA (Remote Direct Memory Access), Fibre Channel (FC), and TCP (Transport Control Protocol)). However, NVMe® implementations have limitations that make it difficult to configure or operate a SAN environment, particularly relative to more mature protocols. Consider the concept of zoning in a Fibre Channel SAN.

Fibre Channel (FC) SAN zoning allows a SAN administrator to control communication between host and storage interfaces by grouping them to a zone. Zones may be created for a number of reasons, including to increase network security, and to prevent data loss or data corruption, by controlling access between devices or user groups. Once in a zone, the interfaces, now referred to as zone members, will be able to communicate with one another when the zone has been added to the active zone set of their fabric.

In Fibre Channel, zoning is managed through the Fabric Zone Server, either directly or through Peer Zoning, as shown in FIG. 1. FIG. 1 depicts typical zoning management in a Fibre Channel environment. Peer Zoning, which is recorded in Fabric Zone Server 110, may be via a management interface 105, or may be done via a storage subsystem (e.g., Storage 3 115).

Specifically, Peer Zoning allows a storage device (e.g., Storage 3 115) to leverage its administratively configured SCSI (Small Computer System Interface) LUN (Logical Unit Number) masking information to generate Zoning constraints. Peer Zoning may be managed through three operations:

(1) Get Active Peer Zone (GAPZ), to read a Peer Zone from the active zone set;
(2) Add/Replace Active Peer Zone (AAPZ), to write a Peer Zone in the active zone set; and
(3) Remove Active Peer Zone (RAPZ), to delete a Peer Zone in the active zone set.

The information carried in the payloads associated with these operations is shown in FIG. 2. The Get Active Peer Zone (GAPZ) operation 200 comprises a GAPZ Request 202, in which a Peer Zone name 204 is submitted to the Fabric Zone Server, which returns in a GAPZ Response 210, a corresponding Peer Zone definition 214 from the active zone set. The Add/Replace Active Peer Zone (AAPZ) operation 220 comprises an AAPZ Request 222, in which the Peer Zone definition 224 is provided to the Fabric Zone Server for adding or replacing, and the Fabric Zone Server returns a confirmation that the operation has been performed (i.e., confirmation of the addition or replacement of the Peer Zone in the active zone set) by sending an AAPZ Response 230. Finally, the Remove Active Peer Zone (RAPZ) operation 240 comprises a RAPZ Request 242 that includes a Peer Zone name 244 that is to be deleted from the active zone set, and the Fabric Zone Server returns a confirmation (i.e., confirmation of the deletion of the Peer Zone from the active zone set) by sending a RAPZ Response 250.

Another limitation or issue is the role of the various devices and the functions that they typically perform in a SAN environment. For example, in a non-volatile memory express over Fabrics (NVMe-oF™) environment, hosts have certain functions and controllers (e.g., input/output (I/O) controllers of a storage subsystem) have different functions. The introduction of a centralized discovery controller (CDC) has helped in facilitating interactions between hosts and subsystems, but they too are affected by the different roles/functionality that exist in current NVMe-oF™ environments. Specifically, the command structure of NVMe® is configured such that a host sends a command, and a controller responds to the command. Given this command structure, it creates issues related to correspondence between two types of controllers, a CDC and a direct discovery controller (DDC) and a CDC since both components are controllers. A DDC is a discovery controller that provides discovery information for a storage subsystem and is typically contained in that storage subsystem.

Accordingly, what is needed are systems and methods that provide increased functional communications between controller entities in a SAN environment.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 2 depicts Peer Zoning payloads for Fibre Channel operations.

FIG. 4 contains Table 1, which lists zoning configuration information, according to embodiments of the present disclosure.

FIG. 16 depicts an alternative command execution request methodology as performed by a pull model DDC, according to embodiments of the present disclosure.

FIG. 30 depicts an alternative methodology of CDC functions for host discovery in a pull model environment, according to embodiments of the present disclosure.

DETAILED DESCRIPTION OF EMBODIMENTS

Figure 1:
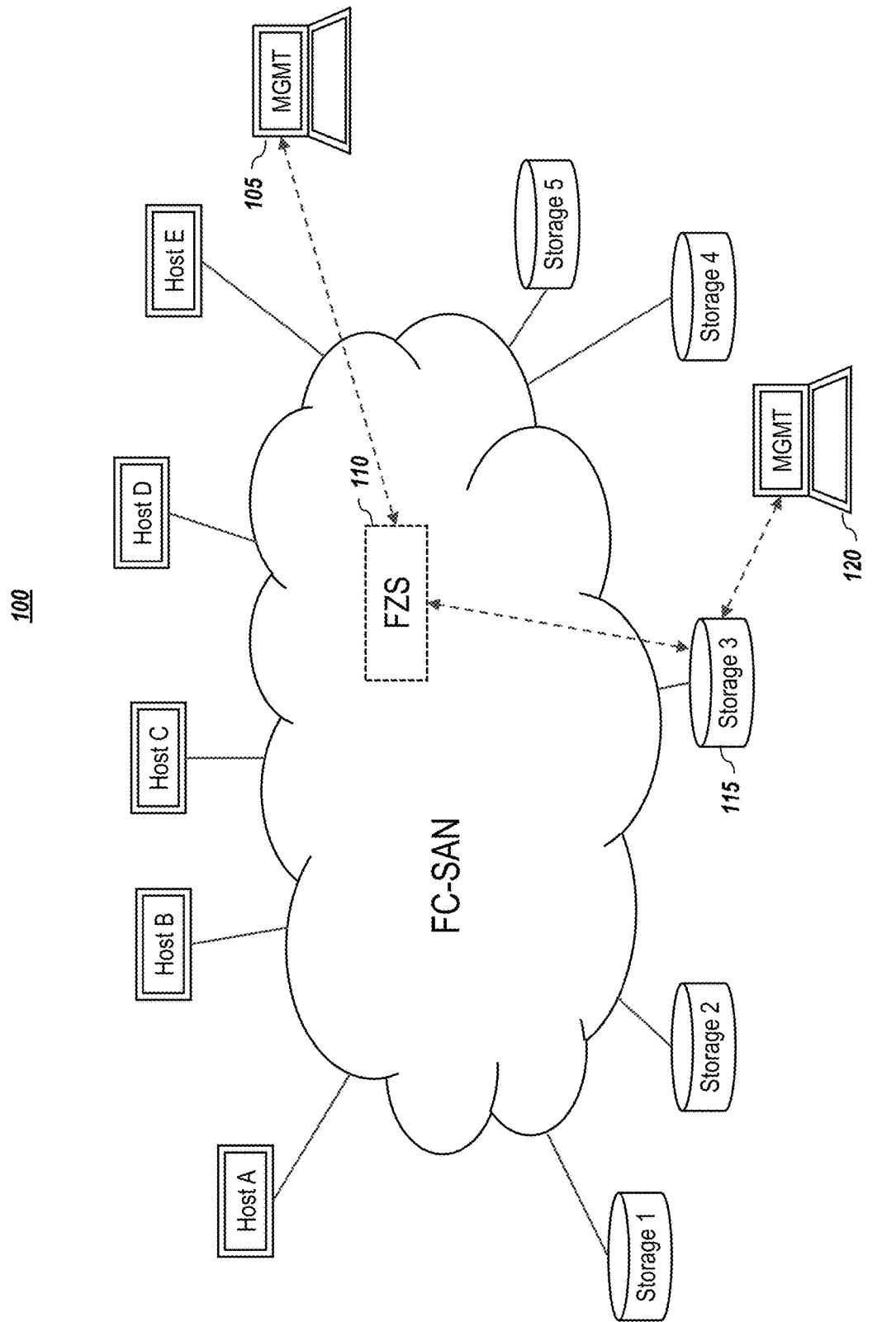
FIG. 1 depicts typical zoning management in a Fibre Channel environment.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, datastore, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of subsystem-driven zoning, aspects of the present disclosure are not so limited. Accordingly, the aspects of the present disclosure may be applied or adapted for use in other contexts.

A. General Introduction

As noted above, zoning operations exist in Fibre Channel, but limitations in NVMe®-over-IP environments do not support analogous functionality. In NVMe-oF™, zoning configurations (i.e., zone groups) are maintained by a centralized (i.e., network-based) discovery controller (CDC), which may also be referred to as a discovery controller, a central discovery controller, or a root discovery controller.

In one or more embodiments, a zone group is a unit of activation (i.e., a set of access control rules enforceable by the CDC). Zone groups may be data structures maintained and managed (i.e., created, read, modified, or deleted) in the zoning database of the CDC. An example zone group dataset or data structure, according to embodiments of the present disclosure, may comprise a zone group name, a zone group originator, a number presenting the number of zones in the zone group, and a list of zone names or definitions are members of the zone group. In one or more embodiments, a Zone Group Originator is an identifier (e.g., an NVMe® Qualified Name (NQN)) of the entity that created or configured the zone group. For example, in one or more embodiments, the NQN may be the CDC's NQN, if the zone group was created/configured directly via the CDC; or, the NQN may be the NQN of an NVM subsystem, if the zone group was created via an NVM subsystem. It shall be noted that identifying the originator allows the system, in one or more embodiments, to determine which entity or entities are allowed to manage or alter an existing zone group.

In one or more embodiments, a zone group may be uniquely identified by a pair, e.g., {ZoneGroup Name, ZoneGroup Originator}, and a zone identifier may be defined by the tuple {{ZoneGroup Name, ZoneGroup Originator}, Zone Name}. It should be noted that previous approaches, such as Fibre Channel, used global naming, which could create conflicts if two zones had the same name. Thus, such a system only works well if there is a single administrator who is carefully tracking each zone name to ensure that each one is unique. However, there typically is not a single administrator, particularly for large systems, which creates an environment in which zone naming conflicts could easily occur. Unlike the global naming used by previous approaches, each zone in embodiments herein is uniquely identified by the tuple so there will not be a conflict between different zones with the same zone name belonging to different zone groups. For example, if an NVM subsystem configured a zone, Zone Alpha, in Zone Group 1 and the CDC configures a zone, Zone Alpha, in Zone Group 2, there will not be a conflict between these two zone names because the two zone identifiers are the tuple (e.g., {ZG1, ZGO-NVM_Sub1, Alpha}vs. {ZG2, ZGO-CDC, Alpha}).

Figure 3:
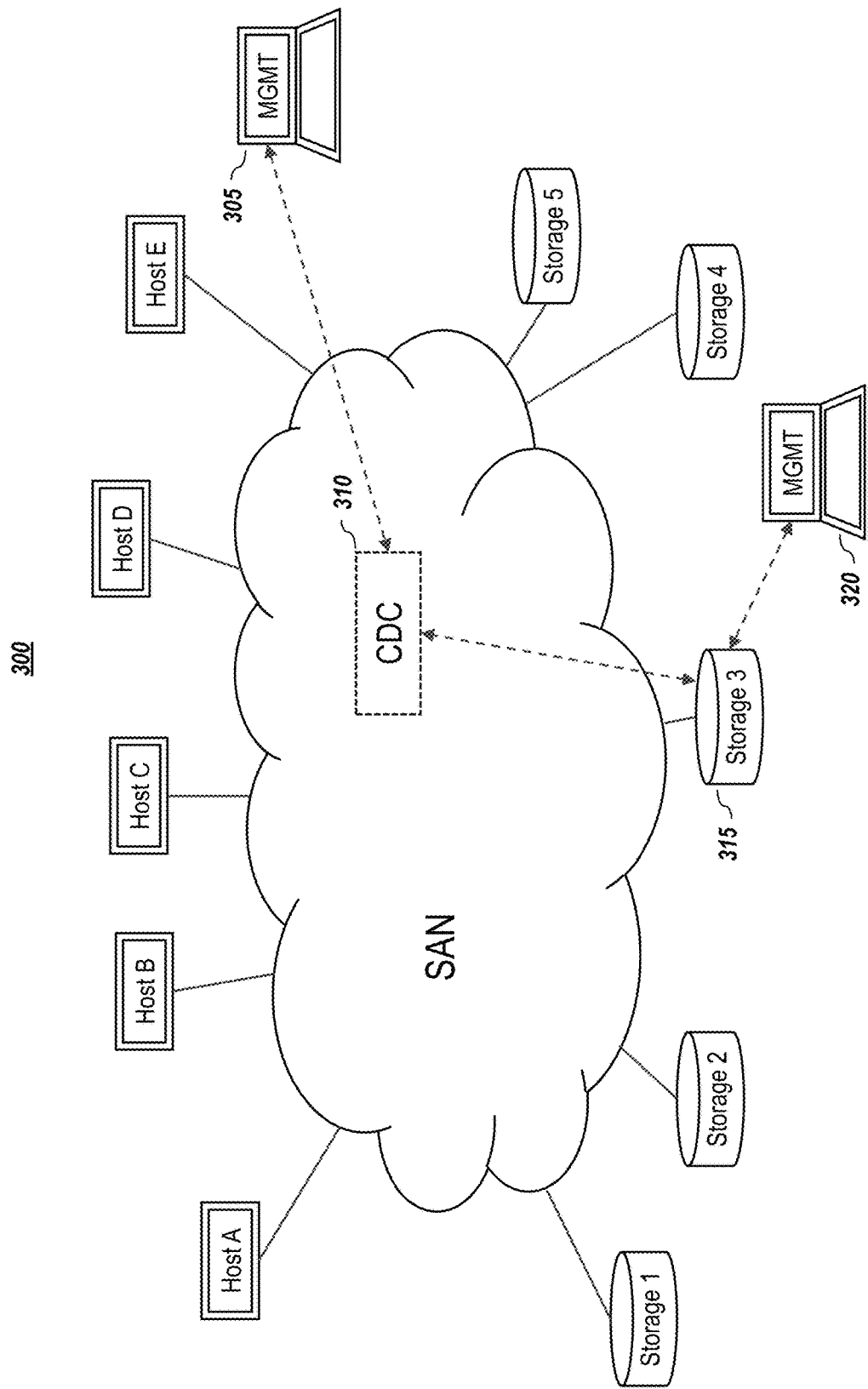
FIG. 3 depicts zoning management in an NVMe™-over Fabrics (NVMe-oF™) environment, according to embodiments of the present disclosure.

In NVMe-oF™, zoning configurations (i.e., zone groups) are maintained by the CDC. FIG. 3 depicts zoning management in an NVMe-oF™ environment, according to embodiments of the present disclosure. As illustrated, zone groups may be generated, activated, and deactivated by a SAN administrator through a management application 305 that interacts with the CDC 310, or by a storage subsystem 315, via a management interface 320, through in-band management commands. A subsystem 315 may generate zone group(s) as a result of storage allocation configurations defined on the device by a storage administrator via a management interface 320.

When a zone group is created on the CDC 310 by a SAN administrator through a management application, the zone group originator is the CDC's NQN. When a zone group is created on the CDC by a subsystem through in-band management commands, the zone group originator is the subsystem's NQN.

Figure 5:
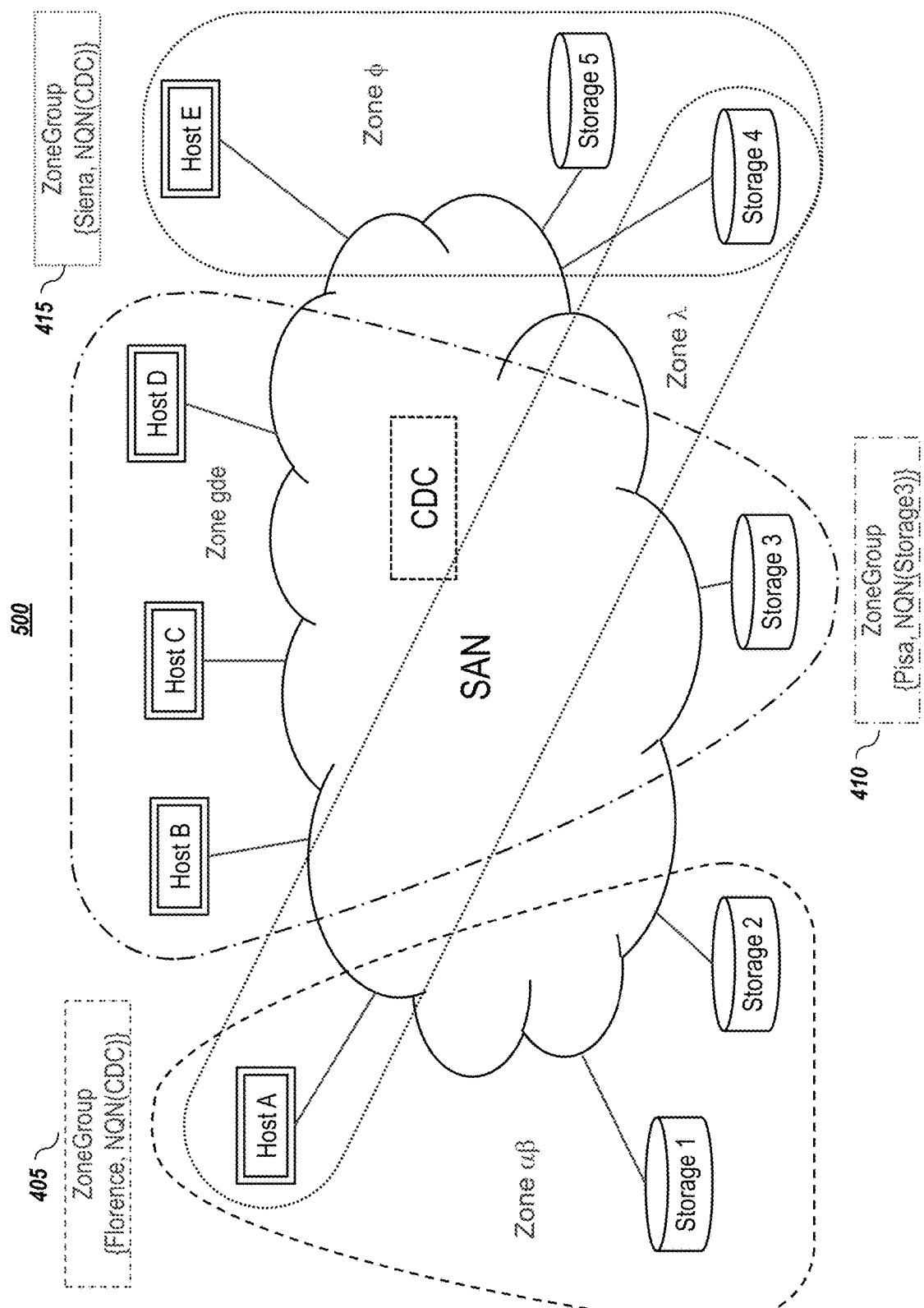
FIG. 5 graphically depicts the zoning configuration of Table 1 (FIG. 4), according to embodiments of the present disclosure.

For example, considering the zoning configuration defined in Table 1, which is shown in FIG. 4, and is represented graphically in FIG. 5, zone groups {Florence, NQN(CDC)} 405 and {Siena, NQN(CDC)} 415 have been created on the CDC by a SAN administrator through a management application and have NQN(CDC) as zone group originator, while ZoneGroup {Pisa, NQN(Storage3)} 410 has been created on Storage 3 and has NQN(Storage3) as zone group originator.

Embodiments of subsystem-driven zoning (SDZ) for NVMe® environments may be based on zone groups, have analogous operations to FC Peer Zoning, and are implemented as NVMe® operations:
(1) Get Active ZoneGroup (GAZ), to read a zone group from the active zone(s) database (ZoneDBActive);
(2) Add/Replace Active ZoneGroup (AAZ), to write a zone group in the ZoneDBActive; and
(3) Remove Active ZoneGroup (RAZ), to delete a zone group in the ZoneDBActive.

Figure 6:
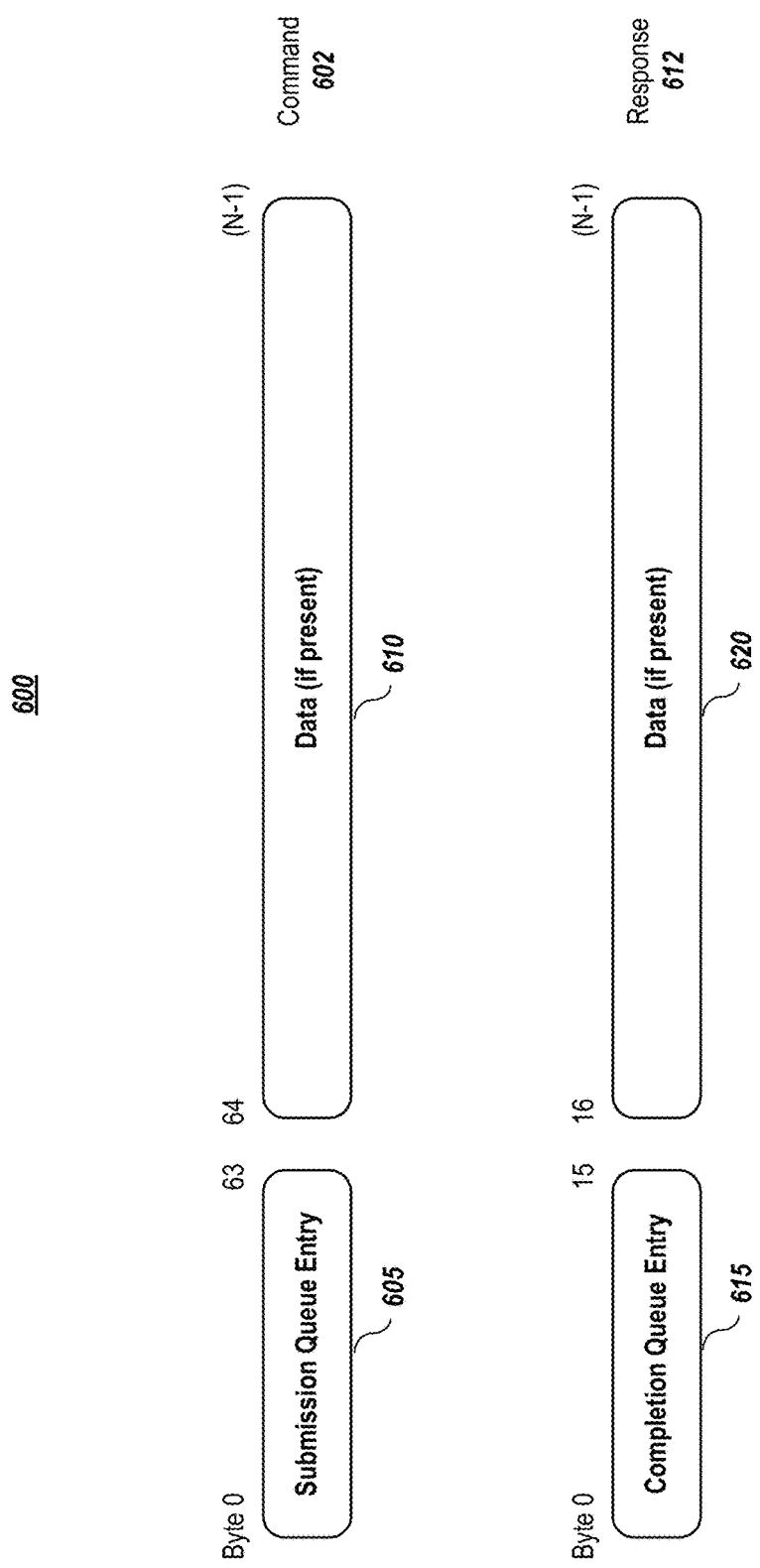
FIG. 6 graphically depicts NVMe® capsule structures, according to embodiments of the present disclosure.

To match the functionality of Fibre Channel, these operations should be supported in NVMe® environments and implemented using NVMe's command/response structure 600. The general structure 600 of NVMe® capsules is shown in FIG. 6. NVMe® supports transfer of data in the direction of the command (host-to-controller data transfer, e.g., a "write" operation) or in the direction of the response (controller-to-host data transfer, e.g., a "read" operation), but not both. A command 602 comprises a submission queue entry 605 and may include a payload transfer 610. Similarly, a response 612 comprises a completion queue entry 615 and may include a data/payload transfer 620. It shall be noted that, while although the byte count for the command data/payload transfer is depicted as continuing from the submission queue entry or completion queue entry, the data transfer may, in one or more embodiments, occur separate from transmission of the submission queue entry or completion queue entry (e.g., at some point before or after transmission of the submission queue entry or completion queue entry).

Figure 7:
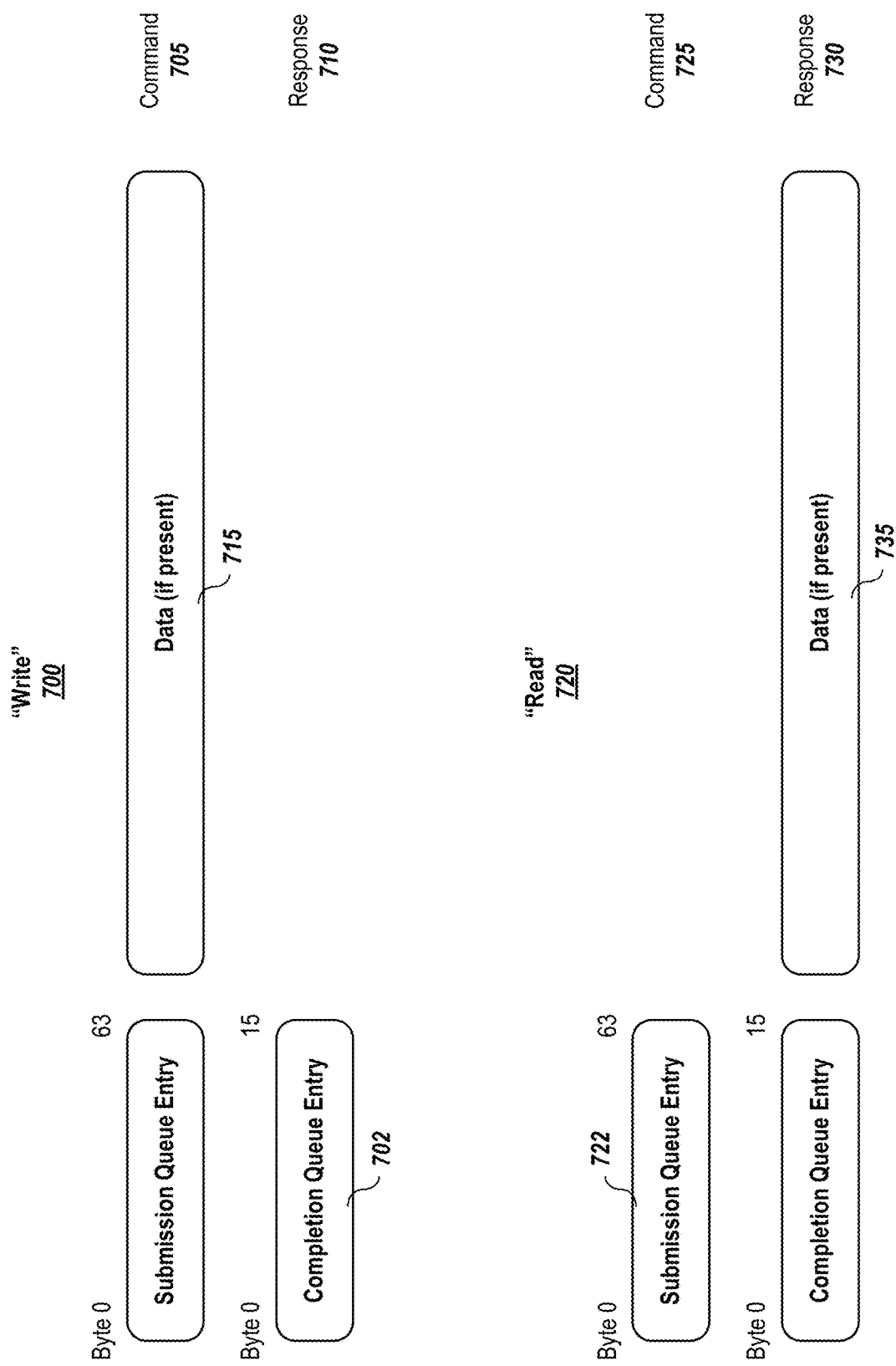
FIG. 7 graphically depicts NVMe-oF™ "write" command and "read" command capsule structures, according to embodiments of the present disclosure.

NVMe-oF supports two types of data transfer: host-to-controller data transfer (e.g., for write commands) and controller-to-host data transfer (e.g., for read commands). As illustrated in FIG. 7, for a "write" operation 700, data (if any) 715 is transferred for the command 705; there is no data transferred for the response 710. Note also that there is a limited data size in the Completion Queue Entry (CQE) 702. A CQE 702 has a size of 16 bytes, not all of which may be available for response data transfer. For a "read" operation 720, data 735 (if any) is transferred for the response 730; there is no data transferred for the command 725. Note also that there is a limited maximum data size in the Submission Queue Entry (SQE) 722. An SQE 722 has a size of 64 bytes, not all of which may be available for command data transfer. It should be noted that, in one or more embodiments, the data may be communicated in a separate data channel related to the command, but note that the data flow is limited to one direction based on the command (e.g., for a "write" command, the data flow is a host-to-controller data transfer, and for a "read" command, the data flow is a controller-to-host data transfer).

Note that this structure does not support bidirectional data transfers for a single command. The lack of bidirectional data transfer for a single command is one of the limitations that exist in NVMe® environments. That is, one of the fundamental problems that needs to be addressed is that the common NVMe® structure does not allow for certain functions to be performed with just one command.

Figure 8:
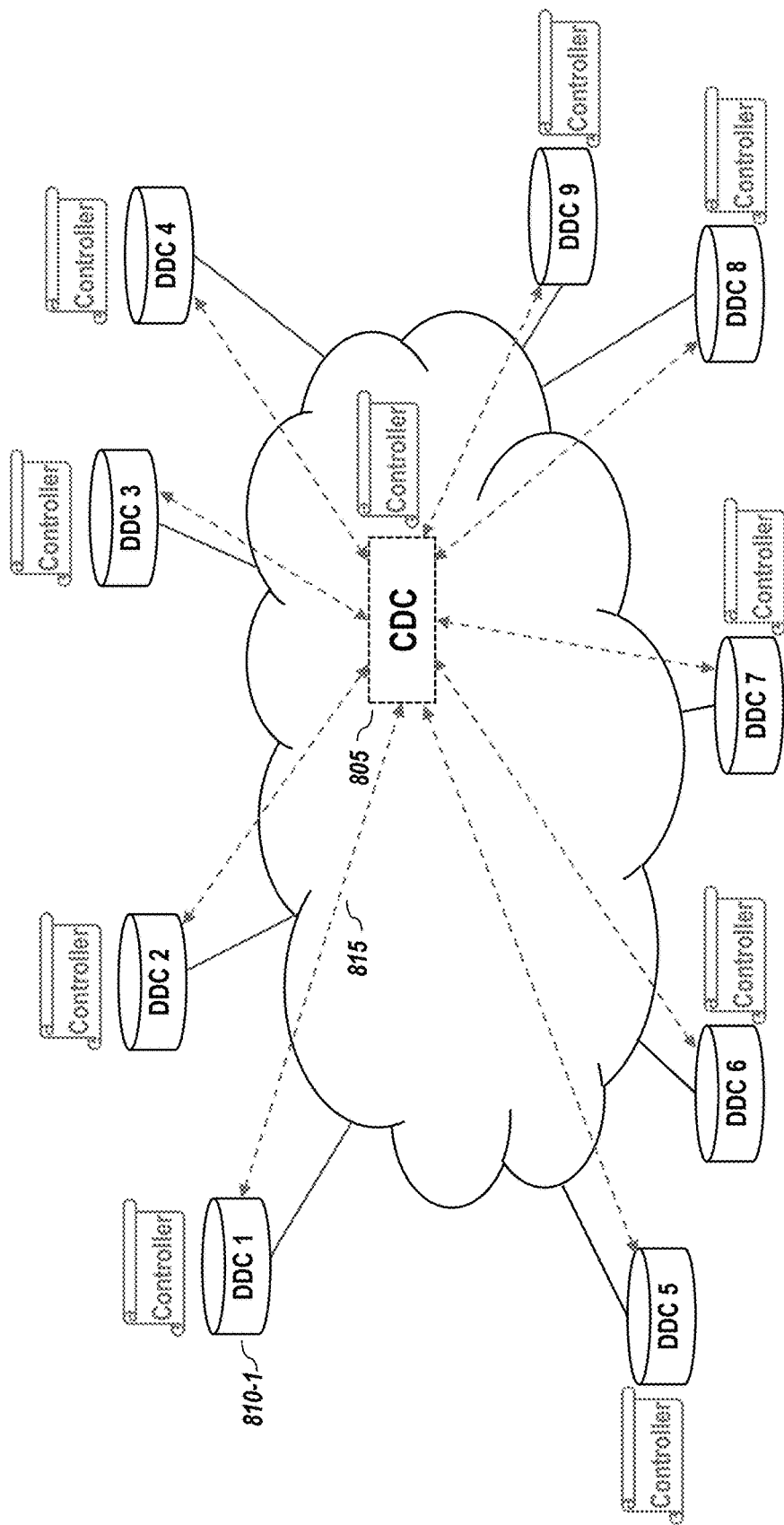
FIG. 8 depicts an NVMe™-over Fabrics (NVMe-oF™) environment.

Another limitation or issue is the role of the various devices and the functions that they typically perform. FIG. 8 depicts an NVMe-over Fabrics (NVMe-oF™) environment 800. Note that the CDC 805 and the direct discovery controllers (DDCs) (e.g., DDC-1 810-1) of the storage/peripheral devices are controllers. The command structure of NVMe® requires that a host sends a command, and a controller responds to the command. The DDCs and the CDC need to communicate—as indicated by the dashed lines (e.g., line 815); however, both components are controllers. To address this issue, push and pull model embodiments were developed.

B. Push Model Embodiments

Figure 9:
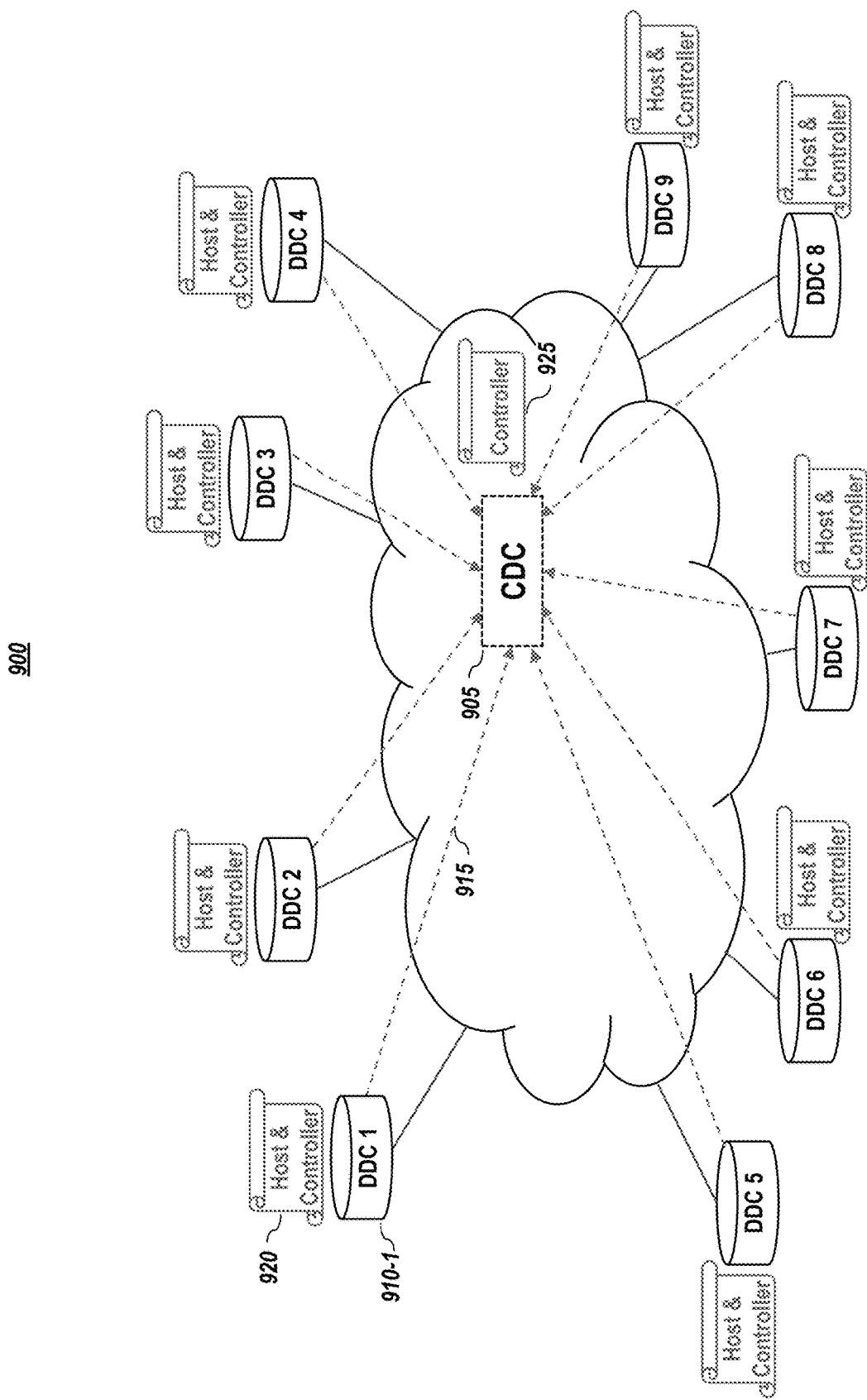
FIG. 9 depicts an NVMe™-over Fabrics (NVMe-oF™) environment that supports push model functionality, according to embodiments of the present disclosure.

FIG. 9 depicts an NVMe™-over Fabrics (NVMe-oF™) environment that supports push model functionality, according to embodiments of the present disclosure. In the depicted embodiment, DDCs implement both host and controller functionality (e.g., 920). Because the DDC supports host functionality, it can send commands to the CDC. For example, DDC-1 910-1 can send 915 a message to the CDC 905. Note that in this structure, the CDC maintains its functionality as solely a controller 925 but is configured to support push model embodiments.

Embodiments also include defining three generic zoning commands, which may be used to implement three subsystem-defined zoning (SDZ) operations, GAZ, AAZ, and RAZ, which were discussed above. In one or more embodiments, the three generic zoning commands are:
(1) Fabric Zoning Lookup (FZL)—which may be used to retrieve a token or key associated with a specified zoning data structure in the CDC;
(2) Fabric Zoning Send (FZS)—which may be used to send zoning data; and
(3) Fabric Zoning Receive (FZR)—which may be used to receive zoning data.

It shall be noted that other operations or commands may also be performed in a similar manner.

Embodiments of storage subsystem-driven zoning are disclosed in co-pending and commonly-owned U.S. patent application Ser. No. 17/699,005, filed on 18 Mar. 2022, entitled "STORAGE SUBSYSTEM-DRIVEN ZONING PROTOCOL EMBODIMENTS IN AN NONVOLATILE MEMORY EXPRESS ENVIRONMENT," and listing Claudio Desanti and David Black as inventors, which patent document is incorporated by reference herein in its entirety and for all purposes. An overview of the various zoning operations is provided below.

1. Get Active ZoneGroup (GAZ) Embodiments

Figure 10:
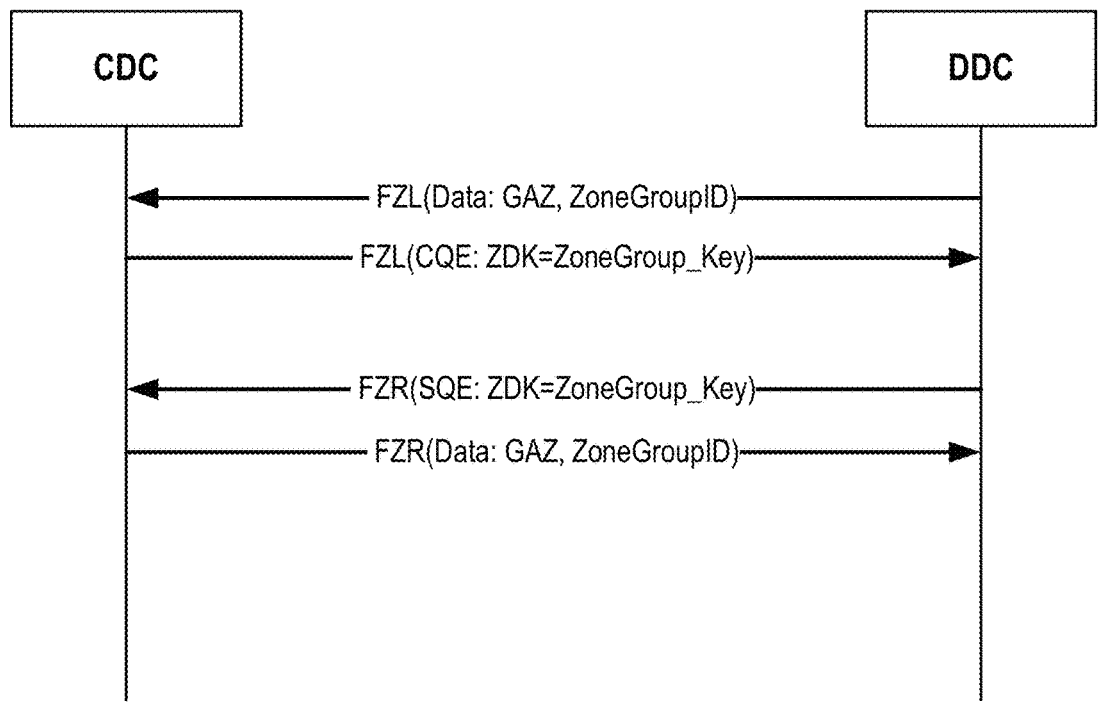
FIG. 10 depicts an example Get Active ZoneGroup (GAZ) operation for a push model DDC, according to embodiments of the present disclosure.

In one or more embodiments, a Get Active ZoneGroup (GAZ) operation allows a DDC to retrieve from the CDC an active zone group associated with the DDC initiating the GAZ operation. For a push model DDC, the GAZ operation may be mapped to a Fabric Zoning Lookup (FZL) command to obtain the key for the zone group, followed by one or more Fabric Zoning Receive (FZR) commands to retrieve that zone group from the CDC. FIG. 10 depicts an example GAZ operation for a push model DDC, according to embodiments of the present disclosure.

2. Add/Replace Active ZoneGroup (AAZ) Embodiments

Figure 11:
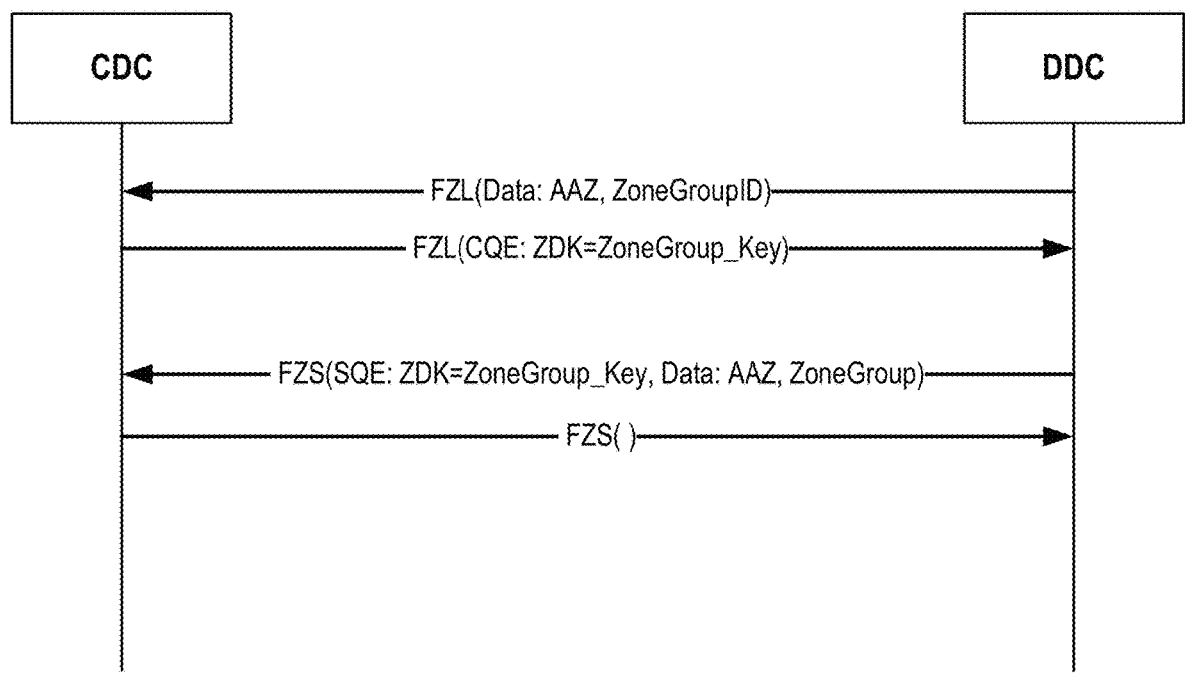
FIG. 11 depicts an example Add/Replace Active ZoneGroup (AAZ) operation for a push model DDC, according to embodiments of the present disclosure.

In one or more embodiments, an Add/Replace Active ZoneGroup (AAZ) operation allows a DDC to add or replace an active zone group associated with the DDC in the CDC. For a push model DDC, the AAZ operation may be mapped to a Fabric Zoning Lookup (FZL) command to lookup the key of the zone group to add or replace in the Zoning database of the CDC, followed by one or more FZS commands to provide the CDC with the zone group to add or replace. FIG. 11 depicts an example AAZ operation for a push model DDC, according to embodiments of the present disclosure.

3. Remove Active ZoneGroup (RAZ) Embodiments

Figure 12:
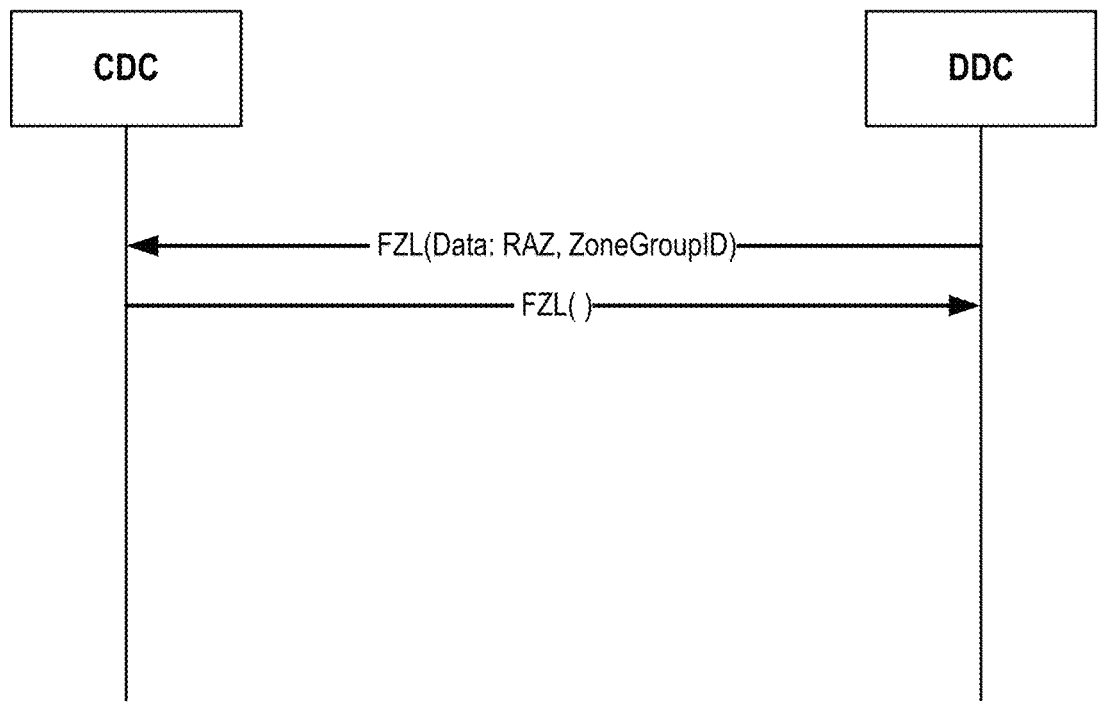
FIG. 12 depicts an example Remove Active ZoneGroup (RAZ) operation for a push model DDC, according to embodiments of the present disclosure.

In one or more embodiments, a Remove Active Zone-Group (RAZ) operation allows a DDC to remove from the CDC an active zone group associated with the DDC initiating the RAZ operation. For a push model DDC, the RAZ operation may be mapped to an FZL command to provide to the CDC with the identifier of the zone group to remove. FIG. 12 depicts an example RAZ operation for a push model DDC, according to embodiments of the present disclosure.

C. Pull Model Embodiments

As noted above with respect to the push model embodiments, the DDCs are configured to have controller functionality and at least some host functionality (such as host functionality for discovery and zoning purposes). Push model embodiments can be beneficial in certain instances. For example, push model embodiment CDCs are more responsive to DDC events and directly support DDC-initiated functionality, such as discovery information registrations, discovery information de-registrations, and zoning operations. However, the typical DDC-controller-to-CDC-controller issue noted above may also be resolved to allow for pull model embodiments. Pull model embodiments are also beneficial in certain instances. For example, pull model embodiments can provide for more predictable behavior for power-up events (e.g., simultaneous power-up of a large number of hosts and storage systems attached to the same fabric) and can provide supported functions, such as discovery information registrations, discovery information de-registrations, among others.

Figure 13:
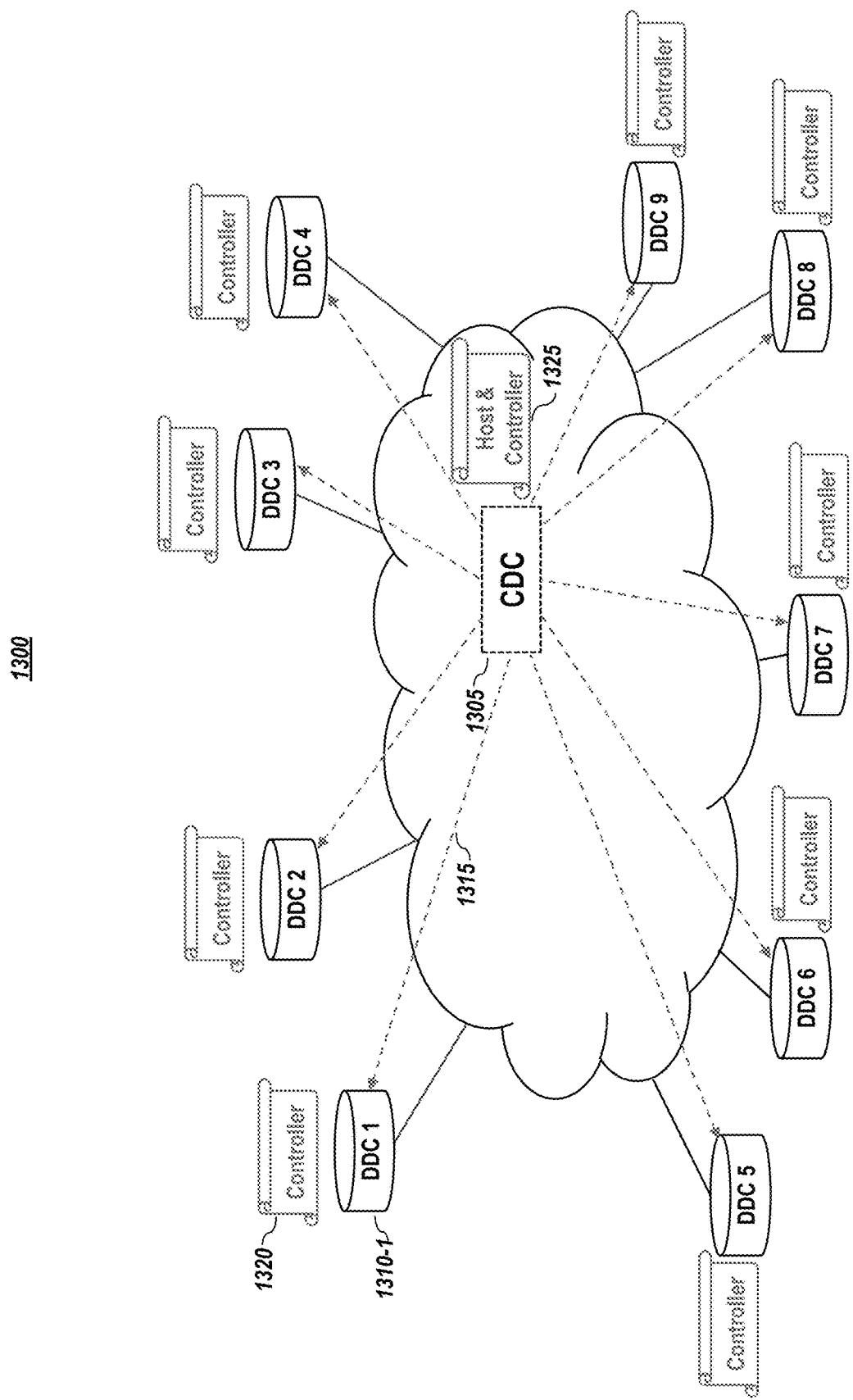
FIG. 13 depicts an NVMe™-over Fabrics (NVMe-oF™) environment that support pull model functionality, according to embodiments of the present disclosure.

FIG. 13 depicts an NVMe™-over Fabrics (NVMe-oF™) environment that support pull model functionality, according to embodiments of the present disclosure. In the depicted embodiment, DDCs implement controller functionality (e.g., 1320). However, the CDC 1325 supports controller and at least some host functionality 1325 (such as host functionality for discovery and zoning purposes). Because the CDC supports host functionality, it can send commands 1315 to the DDCs. For example, CDC 1305 can send a command to DDC-1 1310-1. Note that in this structure, the DDC maintains its functionality as solely a controller 1320 but is enhanced to support pull model embodiments.

1. Command Execution Request for a Pull Device

As noted above, a pull model DDC may execute commands but, by definition, it does not issue commands. In certain interactions between a DDC and a CDC, the DDC might want to initiate some operations. For example, the pull model DDC may want to initialize or update the zoning for a subsystem to which the DDC is associated, or the pull model DDC may want to get information from the CDC, such as host information. However, because the pull model DDC cannot issue commands, currently there is no mechanism by which the DDC can initiate these operations.

Accordingly, embodiments herein provide a solution to the problem of how to allow a pull model DDC to effect a command or operation requested by the DDC under the limitation that a pull model DDC does not send commands. In one or more embodiments, a solution comprises defining and using a new Asynchronous Event Notification (AEN) type that essentially indicates "I [the DDC] am a pull model device, I want you [the CDC] to do something." In response to such an AEN, in one or more embodiments, a Get Log Page (GLP) command follows that essentially asks the DDC: "What do you want?"—rather than the typical GLP command, which states to the DDC: "Give me this requested information." Using these notifications and commands in such a way represents a significant transformation and paradigm shift. Note also, that the data portion of a Get Log Page response allows for flexibility in specifying what is requested (e.g., an individual command or an operation that comprises a set of commands).

Figure 14:
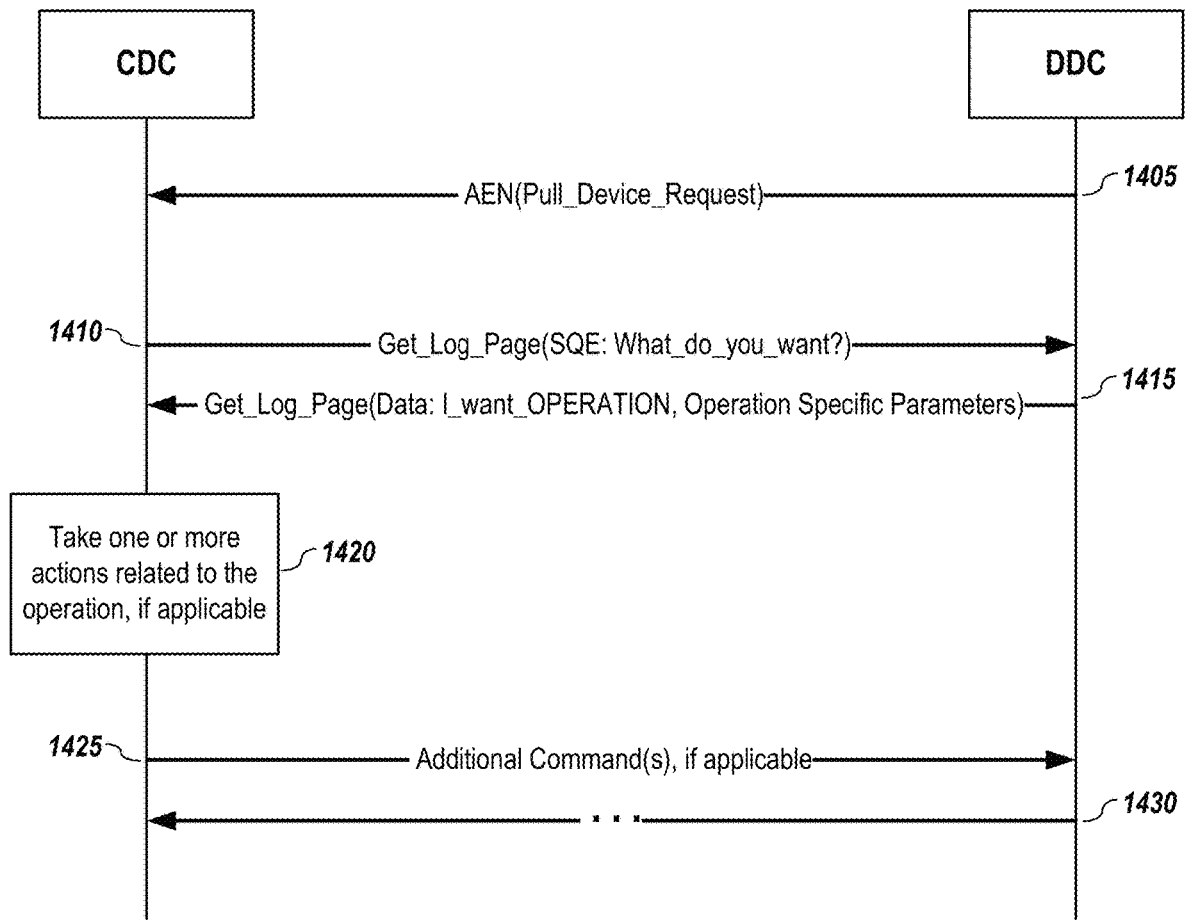
FIG. 14 depicts a general command execution request for a pull model device, according to embodiments of the present disclosure.

FIG. 14 depicts a general command execution request for a pull model device, according to embodiments of the present disclosure. In one or more embodiments, the direct discovery controller (DDC) sends (1405) an Asynchronous Event Notifications (AEN) to the centralized discovery controller (CDC). In the Completion Queue Entry (CQE) of the AEN, there may be an indicator/value (e.g., F3h) for the "Asynchronous Event Type" to indicate that this AEN is a "Pull DDC Request" notice. A "Pull DDC Request" notice may be defined to indicate to the CDC that a pull model DDC is requesting the CDC to perform an operation on the DDC's behalf.

Note that the AEN (1405) may be a response to a prior Asynchronous Event Request (AER) command (which is not depicted in FIG. 14) that the CDC sent to the DDC. An AER is a mechanism by which a sender of the AER can request to receive a notice when there is a change (e.g., a state change) at or to the recipient of the AER. In one or more embodiments, the CDC may subscribe (e.g., using Asynchronous Event Configuration (Feature Identifier 0Bh) or a feature that provides for such subscription functionality) to get notifications for a certain duration, certain number of changes, certain types of changes, or may be a standing request that remains in force until cancelled. Thus, in one or more embodiments, in FIG. 14, it may be assumed that at some point before the AEN (1405), the CDC sent an AER to the DDC to register to receive a notice from the DDC.

In response to the AEN, the CDC performs (1410) a response activity. In one or more embodiments, the response activity is a Get Log Page (GLP) command requesting a Pull DDC Request Log Page. The new Pull DDC Request Log Page may be identified by a unique Log Page Identifier (e.g., 73h).

Accordingly, the DDC responds (1415) with the Pull DDC Request Log Page, which is a new type of Log Page that allows the DDC to respond with the operation that the DDC wants performed. In one or more embodiments, the format of the Pull DDC Request Log Page may comprise in the data portion of the GLP response an Operation Request Identifier (ORI), which is a field that indicates the operation that a pull model DDC is requesting a CDC to perform and may also include other operation specific parameters (if applicable). In one or more embodiments, certain Operation Request Identifier values may correspond to certain operations, for example:

| ORI Value | Definition |
| --- | --- |
| 00 | <reserved> |
| 01 | Get Active Zone (GAZ) operation |
| 02 | Add/Replace Active Zone (AAZ) operation |
| 03 | Remove Active Zone (RAZ) operation |
| 04 | Log Page Request operation |
| ... | <other operations> |

In one or more embodiments, a type-length-value (TLV) structure may be used:

Type: what is requested (e.g., GAZ)

Length: length of the provided parameters

Value: the operation specific parameters of the request (e.g., {transaction identifier (T_ID), ZoneGroupID})

Depending upon the specific operation, the CDC may take (1420) one or more actions to perform or execute the operation. In one or more embodiments, one or more additional commands (1425, 1430, etc.) may be performed to complete the operation. For example, if the request from the DDC was to obtain a host discovery log page, the CDC may read (1420) data from a database/datastore regarding the host(s) relevant to the requesting DDC and may then transmit (1425) the information to the DDC. Also, in one or more embodiments, the CDC may send another AER so that the DDC may send another AEN when it wants another operation performed.

Figure 15:
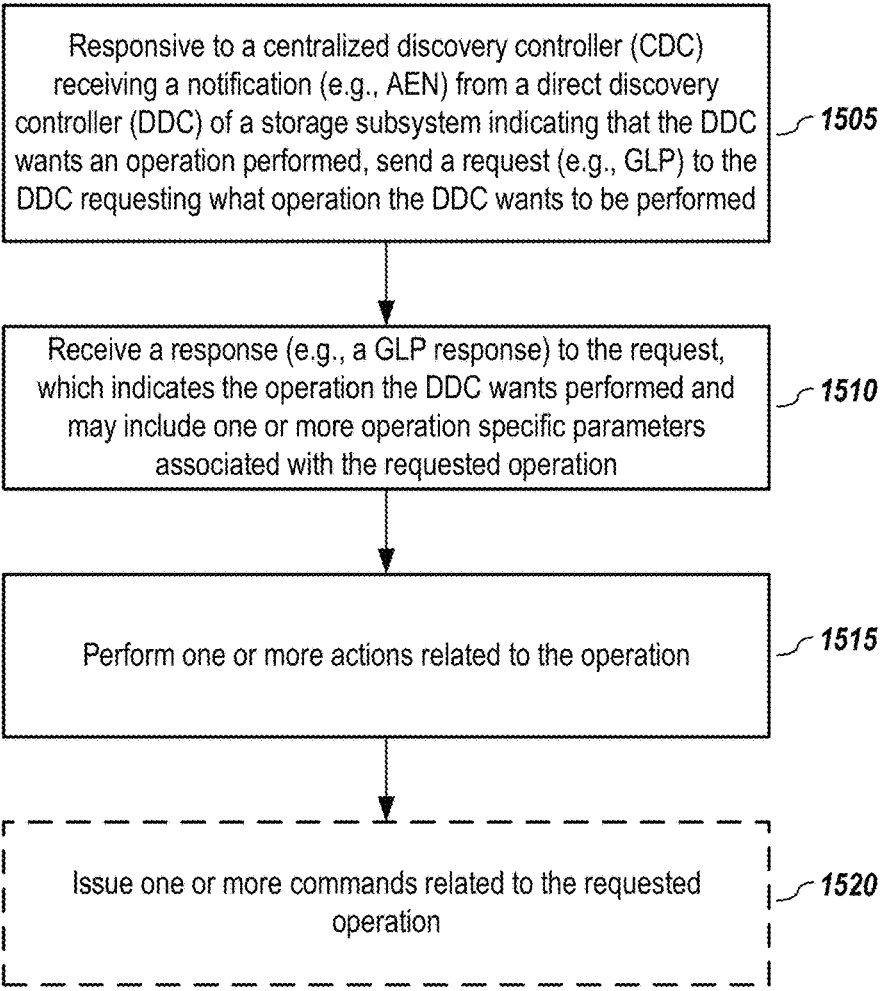
FIG. 15 depicts an alternative command execution request methodology as performed by a CDC, according to embodiments of the present disclosure.

FIG. 15 depicts an alternative command execution request methodology as performed by a CDC, according to embodiments of the present disclosure. In one or more embodiments, responsive to a CDC receiving a notification (e.g., AEN) from a DDC of a storage subsystem indicating that the DDC wants to perform an operation, the CDC sends (1505) a request (e.g., a GLP) to the DDC requesting what operation the DDC wants performed. While not depicted in FIG. 15, the CDC may previously have sent an Asynchronous Event Request (AER) command to request to receive a notice from the DDC. This action enables the DDC to send the AEN. The CDC receives (1510) a response (e.g., a GLP response that contains the contents of a Log Page) to the request, which indicates the operation the DDC wants performed and may include one or more operation specific parameters associated with the requested operation. The CDC may then perform (1515) one or more actions related to the requested operation (if applicable to the requested operation), and may, if applicable, issue (1520) one or more commands related to the requested operation. Also, in one or more embodiments, the CDC may send another AER so that the DDC may send another AEN when it wants another operation performed.

FIG. 16 depicts an alternative command execution request methodology as performed by a pull model DDC, according to embodiments of the present disclosure. In one or more embodiments, the DDC sends (1605) to a CDC a notification (e.g., AEN) that indicates that the DDC wants an operation performed. While not depicted in FIG. 16, the DDC may previously have received from the CDC an Asynchronous Event Request (AER) command, which enables the DDC's sending of the AEN. The DDC receives a CDC response (e.g., GLP request) from the CDC requesting what operation the DDC wants performed, and responsive to receiving the CDC response containing a CDC request, the DDC sends (1610) a DDC response (e.g., GLP response) to the CDC that specifies what the DDC wants performed and may include one or more operation specific parameters associated with the requested operation. In one or more embodiments, the DDC may receive (1615) from the CDC one or more messages related to the requested operation. Also, in one or more embodiments, the DDC may receive another AER from the CDC so that the DDC may send an AEN when it wants another operation performed.

Example use case embodiments are provided in the following sections.

2. Subsystem Driven Zoning Embodiments

Given a command execution request embodiment as discussed in the prior section, a pull model device may use the command execution request framework and generic zoning commands (i.e., FZL, FZS, and FZR) to implement corresponding subsystem-defined zoning (SDZ) operations, GAZ, AAZ, and RAZ.

a) Get Active ZoneGroup (GAZ) Embodiments

Figure 17:
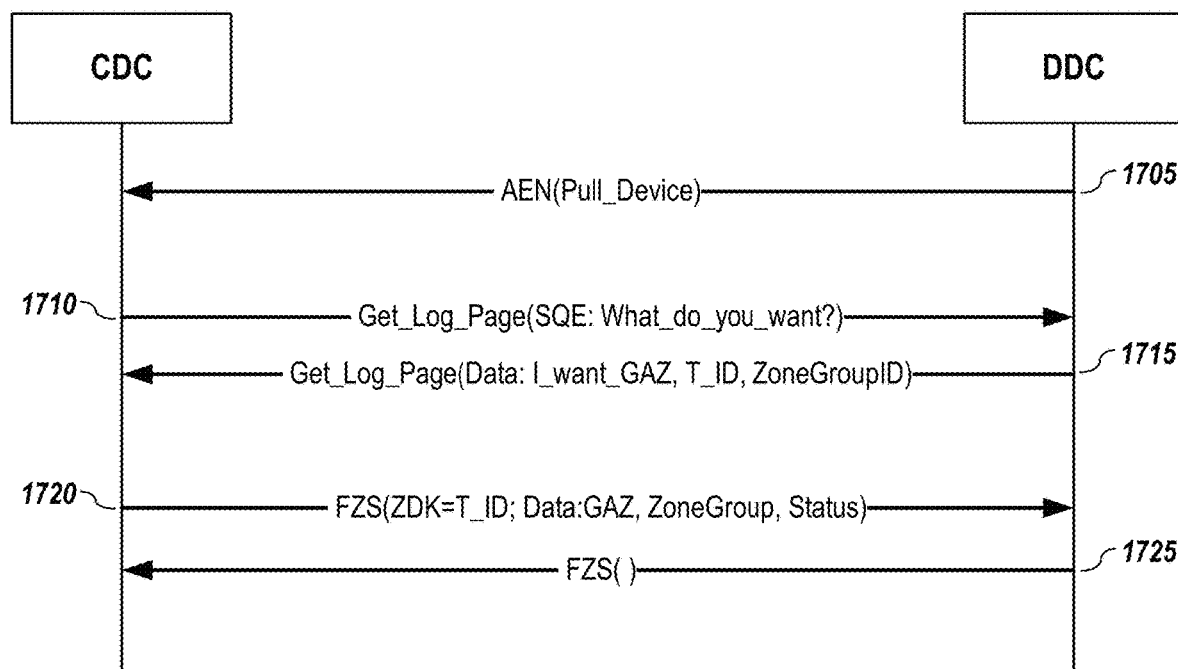
FIG. 17 depicts a Get Active ZoneGroup (GAZ) operation in a pull model environment, according to embodiments of the present disclosure.

In one or more embodiments, a Get Active ZoneGroup (GAZ) operation allows a DDC to retrieve from the CDC an active zone group associated with that DDC. FIG. 17 depicts a Get Active ZoneGroup (GAZ) operation in a pull model environment, according to embodiments of the present disclosure.

In one or more embodiments, for a pull model DDC, the GAZ operation may be initiated (1705) with a pull DDC request Asynchronous Event Notification (AEN), in which the DDC notifies the CDC of a request.

In one or more embodiments, the CDC responds (1710) to that asynchronous event report with a Get Log Page command requesting the pull DDC Request Log Page—essentially, the command asks the DDC what operation the DDC wants performed. Upon receipt of the Get Log Page command from the CDC, the DDC may respond (1715) with a Log Page requesting a GAZ operation for a specified zone group and may include in a Zoning Data Key (ZDK) field a transaction identifier (T_ID), which is used to relate the Log Page Entry for the pull model GAZ to any subsequent FZS command(s) related to this operation.

In one or more embodiments, the GAZ operation is completed by the CDC, which includes issuing one or more FZS commands to send (1720) that zone group and the operation status to the DDC, as shown in FIG. 17. The zone group definition may be sent through the one or more subsequent FZS commands and may be provided in the FZS buffer. The FZS command sending the buffer containing the last fragment may have a Last Fragment (LF) bit set to a value (e.g., "1") to indicate that it is the last fragment. In one or more embodiments, a transaction identifier (e.g., T_ID) is used in all commands for this operation, regardless of whether one or multiple are used.

Note that, while not depicted in FIG. 17, the CDC may, as part of completing the GAZ operation, may read information from a zoning datastore to obtain the requested zoning information.

In one or more embodiments, different values may be assigned to indicate different operation statuses. The various statuses may include, for example: operation successful, operation in progress, zone group does not exist on the CDC, zone group is locked on the CDC, ZoneGroup Originator Invalid, or other statuses.

In one or more embodiments, when a zone group is transferred in multiple fragments, if the CDC detects the zone group definition is changed while sending the fragments, the CDC may issue an FZS command with a zero-length zone group fragment and operation status value (e.g., 5h) to alert the DDC that the GAZ operation has been aborted.

If the zone group indicated in the Log Page Entry for a pull model GAZ does not exist on the CDC, the CDC may issue an FZS command with a zero-length zone group fragment and an operation status value (e.g., 2h), and the GAZ operation may be aborted.

If the zone group indicated in the Log Page Entry for a pull model GAZ is locked on the CDC (e.g., another administrative interface is modifying that zone group), the CDC may issue an FZS command with a zero-length zone group fragment and operation status value (e.g., 3h), and the GAZ operation may be aborted.

If the zone group indicated in the Log Page Entry for a pull model GAZ is not locked on the CDC, the CDC continues to perform the GAZ operation by issuing one or more FZS commands carrying the one or more fragments that comprise the requested zone group. Note that it shall be understood that, depending upon the amount of data, one fragment may carry all the requested information and satisfy the request. In one or more embodiments, the last FZS command carries an operation status (e.g., 0h), the other FZS commands may have an operation status (e.g., 1h) to indicate that the operation is in-progress.

In one or more embodiments, the DDC may not process received zone group information until the full zone group (i.e., all of the fragments of the zone group) is received.

In one or more embodiments, the CDC may enforce access restrictions to the zoning data structures. In these embodiments, the CDC may check whether the DDC requesting the GAZ operation is authorized to read the zone group indicated in Log Page Entry for pull model GAZ (e.g., if the CDC allows access to a zone group only to the DDC that created that zone group, then the CDC verifies that the ZoneGroup Originator of the indicated zone group matches the NQN contained in the SUBNQN field of the Connect command sent from the CDC to that DDC). If that DDC is not authorized to access the specified zone group, the CDC may issue an FZS command with a zero-length zone group fragment and operation status that the zone group originator in invalid (e.g., 4h), and the GAZ operation may be aborted.

As noted above, the FZS command or commands may specify the transaction identifier as a Zoning Data Key (ZDK). Note that, in one or more embodiments, if a ZDK is issued by a DDC, the ZDK field specifies the key identifying a zoning data structure in the zoning database of the CDC. If the FZS command is issued by the CDC, this ZDK specifies the transaction identifier of the current zoning operation.

b) Add/Replace Active ZoneGroup (AAZ) Embodiments

Figure 18:
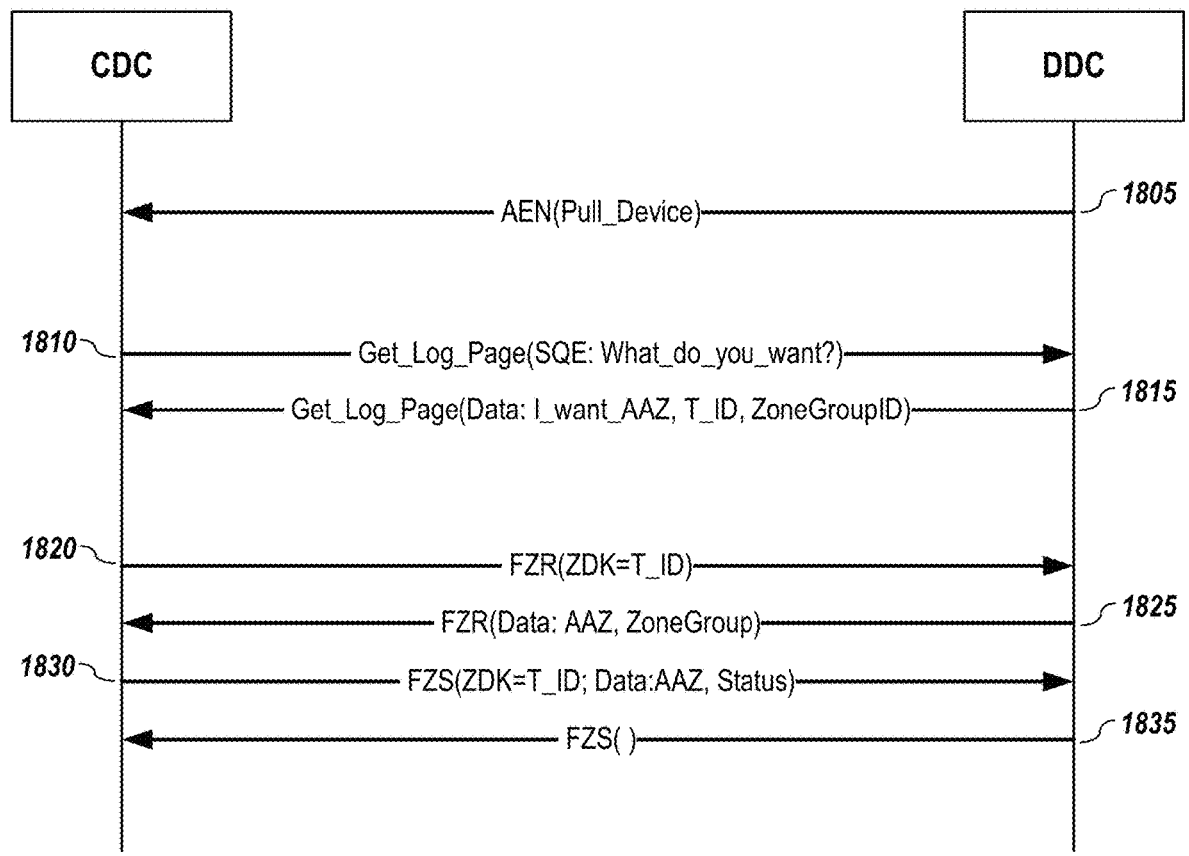
FIG. 18 depicts an Add/Replace Active ZoneGroup (AAZ) operation in a pull model environment, according to embodiments of the present disclosure.

In one or more embodiments, an Add/Replace Active ZoneGroup (AAZ) operation allows a DDC to add or replace in the CDC an active zone group associated with that DDC. FIG. 18 depicts an Add/Replace Active ZoneGroup (AAZ) operation in a pull model environment, according to embodiments of the present disclosure.

As illustrated in FIG. 18, for a pull model DDC, the AAZ operation may be mapped (1805) to a Pull DDC Request Asynchronous Event indication. The CDC may respond (1810) to that asynchronous event report with a Get Log Page command requesting the Pull DDC Request Log Page, in which the CDC learns what the DDC wants to be performed. The DDC responds (1815) with a Log Page requesting an AAZ operation for a specified zone group, as shown in FIG. 18.

In one or more embodiments, the operation specific parameters of a Pull DDC Request Log Page requesting an AAZ may include a transaction identifier (T_ID), a Zone-Group Originator identifier, and a ZoneGroup Name. The transaction ID field may be used to relate the Log Page Entry for a pull model AAZ to subsequent FZR or FZS command(s). The FZR or FZS command(s) may specify the transaction ID as a Zoning Data Key in a command Dword. Returning to FIG. 18, the CDC sends (1820) an FZR command with the transaction ID, and the DDC responds (1825) indicating that it wants an AAZ operation and indicates the specific zone group.

The CDC performs (not shown in FIG. 18) the requested operation (i.e., adding or replacing the specified zone group). The CDC responses (1830) via one or more FZS commands to indicate the status to the DDC. As illustrated, the FZS command(s) include the linking transaction ID and the data related to the AAZ command and the status.

In one or more embodiments, if the specified zone group is locked on the CDC, the AAZ operation may be completed by the CDC by issuing one FZS command with an operation status to the DDC that the zone group does not exist or is unavailable on the CDC. The transaction ID value returned by the DDC in the Log Page Entry for a pull model AAZ may be the same in the FZS command for this AAZ operation.

If the specified zone group either does not exist in the CDC zoning database or exists in the CDC zoning database and is not locked by another administrative interface, the CDC may lock the specified zone group in the zoning database and complete the AAZ operation by issuing (e.g., 1820) one or more FZR commands to request from the DDC the zone group definition to add/replace, followed (e.g., 1830) by one or more FZS commands to report status information to the DDC. The zone group definition may be sent through one or more FZR commands and may be provided in the FZR buffer, which indicated via a value for the operation type (e.g., Add/Replace Active ZoneGroup for a pull model DDC), an indicator of fragment length, and the zone group fragment. The FZR completion queue entry sending the buffer containing the last fragment may have a Last Fragment (LF) bit set (e.g., set to "1" in Completion Queue Entry Dword 0).

In one or more embodiments, the CDC may not process received zone group information until the full zone group information (i.e., all of the fragments of the zone group) is received. Upon receiving the zone group information, in one or more embodiments, the CDC updates that zone group in its Zoning database, increments its generation number, and issues an FZS command with operation status indicating successful completion to the DDC.

The AAZ operation status field may be used to encode various status information for the pull model AAZ operation. Examples of operation status may include, for example, operation successful, zone group is locked on the CDC, or other statuses.

In one or more embodiments, the CDC may enforce access restrictions to the Zoning data structures. In such embodiments, the CDC checks if the DDC requesting the AAZ operation is authorized to write the zone group indicated in Log Page Entry for Pull Model AAZ (e.g., if the CDC allows access to a zone group only to the DDC that created that zone group, verify that the ZoneGroup Originator field matches the NQN contained in the SUBNQN field of the Connect command sent from the CDC to that DDC). If that DDC is not authorized to access the specified zone group, the CDC may issue an FZS command with operation status that the ZoneGroup Originator Invalid status, and the AAZ operation may be aborted.

c) Remove Active ZoneGroup (RAZ) Embodiments

Figure 19:
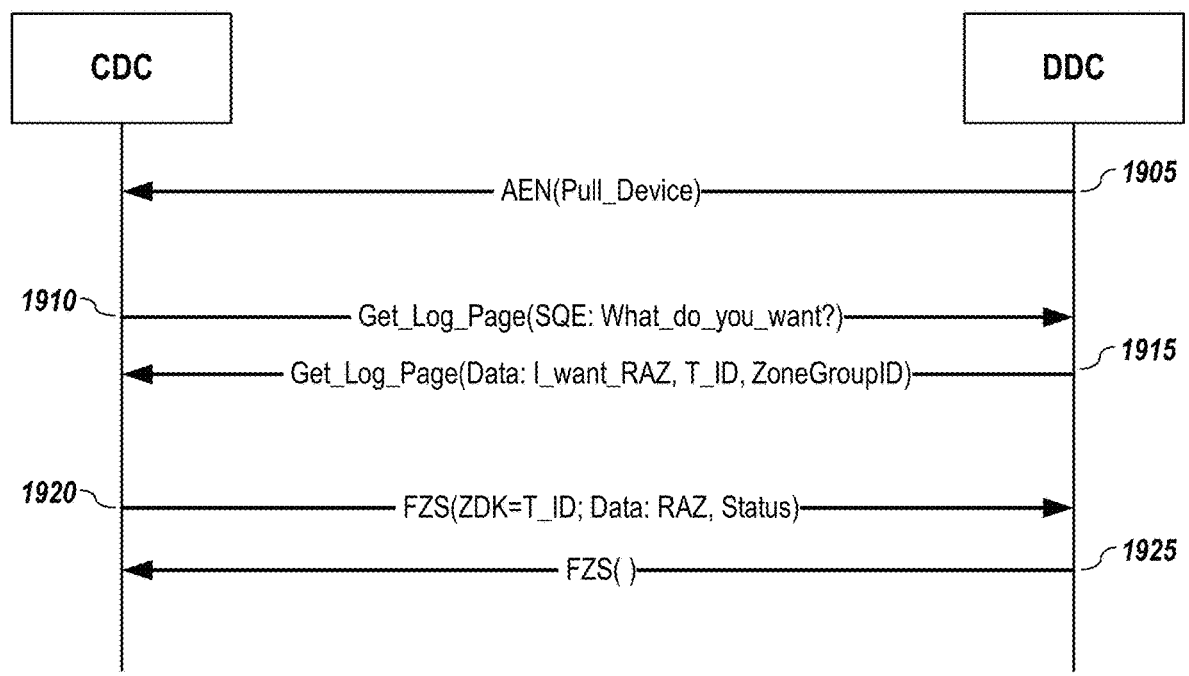
FIG. 19 depicts a Remove Active ZoneGroup (RAZ) operation in a pull model environment, according to embodiments of the present disclosure.

In one or more embodiments, a Remove Active Zone-Group (RAZ) operation allows a DDC to remove from the CDC an active zone group associated with the DDC. FIG. 19 depicts a Remove Active ZoneGroup (RAZ) operation in a pull model environment 1900, according to embodiments of the present disclosure.

As illustrated in FIG. 19, for a pull model DDC, a RAZ operation may be mapped (1905) to a Pull DDC Request Asynchronous Event indication. The CDC responds (1910) to that asynchronous event report (e.g., with a Get Log Page command) requesting the Pull DDC Request Log Page, to which the DDC may respond (1915) with a Log Page requesting an RAZ operation for a specified zone group. As noted above, a format of the operation specific parameters of a Pull DDC Request Log Page requesting a RAZ operation may comprise a Transaction ID (T_ID), a ZoneGroup Originator, and a ZoneGroup Name.

In one or more embodiments, the CDC removes the specified zone group from the active dataset, and the RAZ operation may be considered complete by the CDC by issuing (1920) a FZS command to report status information to the DDC. The DDC may respond (1925) indicating that the FZS command was received.

As with the other operations, the Transaction ID field may be used to relate the Log Page Entry for a pull model RAZ to the subsequent FZS command; the FZS command may specify the Transaction ID as a Zoning Data Key. In one or more embodiments, the RAZ operation status sent through the FZS command may be provided in the FZS buffer, in which the operation type field is identified by a set value (i.e., RAZ status for a pull model DDC) and an RAZ operation status field is used to encode status information for the pull model RAZ operation.

If the zone group indicated in the Log Page Entry for a pull model RAZ does not exist on the CDC, the CDC may issue an FZS command with operation status indicating such, and the RAZ operation may be aborted.

If the zone group indicated in the Log Page Entry for a pull model RAZ is locked on the CDC (e.g., another administrative interface is modifying that zone group), the CDC may issue an FZS command with operation status indicate such, and the RAZ operation may be aborted.

If the zone group indicated in the Log Page Entry for a pull model RAZ is not locked on the CDC, the CDC continues the RAZ operation by removing the requested zone group from the Zoning database and by issuing a subsequent FZS command with operation status indicating that the operation was successful.

In one or more embodiments, the CDC may enforce access restrictions to the Zoning data structures. In such embodiments, the CDC may check if the DDC requesting the RAZ operation is authorized to remove the zone group indicated in Log Page Entry for Pull Model RAZ (e.g., if the CDC allows access to a zone group only to the DDC that created that zone group, the CDC may verify that the ZoneGroup Originator field matches the NQN contained in the SUBNQN field of a Connect command sent from the CDC to that DDC). If that DDC is not authorized to access the specified zone group, the CDC may issue an FZS command with operation status indicating such, and the RAZ operation may be aborted.

d) General Subsystem-Driven Zoning Embodiments

Figure 20:
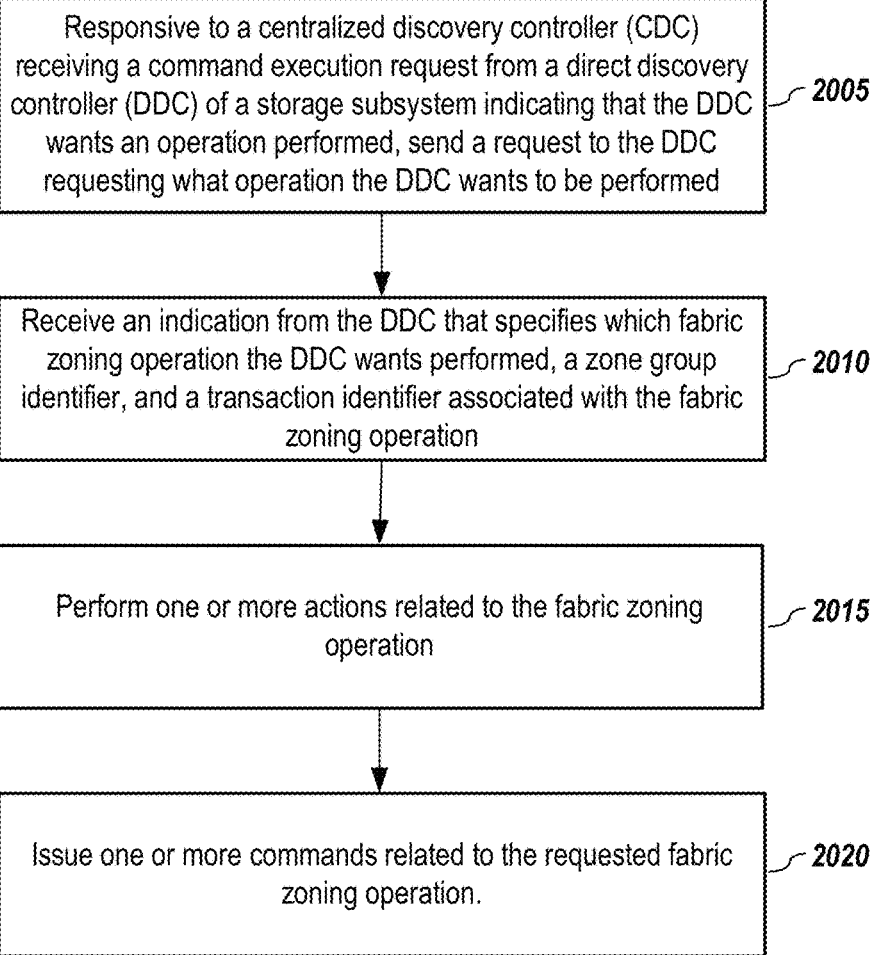
FIG. 20 depicts general centralized discovery controller (CDC) functions for various operations in a pull model environment, according to embodiments of the present disclosure.

FIG. 20 depicts general CDC functions for various operations in a pull model environment, according to embodiments of the present disclosure. In one or more embodiments, responsive to a centralized discovery controller (CDC) receiving a command execution request from a direct discovery controller (DDC) of a storage subsystem indicating that the DDC wants to perform an operation, the CDC sends (2005) a request to the DDC requesting what operation the DDC wants performed. The CDC receives (2010) an indication from the DDC that specifies which fabric zoning operation the DDC wants performed, a zone group identifier, and a transaction identifier associated with the fabric zoning operation, and the CDC performs (2015) one or more actions related to the fabric zoning operation (which may be performed prior to sending the status message or concurrently with sending the status message). For example, the CDC may look-up information related to the specified zone group, may add/replace the specified zone group, or may delete the specified zone group. In one or more embodiments, to complete the process flow, the CDC may issue (2020) one or more commands related to the requested fabric zoning operation. For example, the CDC may send a status message to the DDC indicating the transaction identifier associated with the fabric zoning operation and a status of execution of the fabric zoning operation.

As noted above, the fabric zone operation may be any of a number of operations. For example, the fabric zoning operation (GAZ) allows the DDC to get information from the CDC about an active zone group associated with the DDC; the fabric zoning operation (AAZ) allows the DDC to add or replace in the CDC an active zone group associated with the DDC; and the fabric zoning operation (RAZ) allows the DDC to remove from the CDC an active zone group associated with the DDC. Also, in one or more embodiments, the CDC may send another AER so that the DDC may send an AEN when it wants another operation performed.

Figure 21:
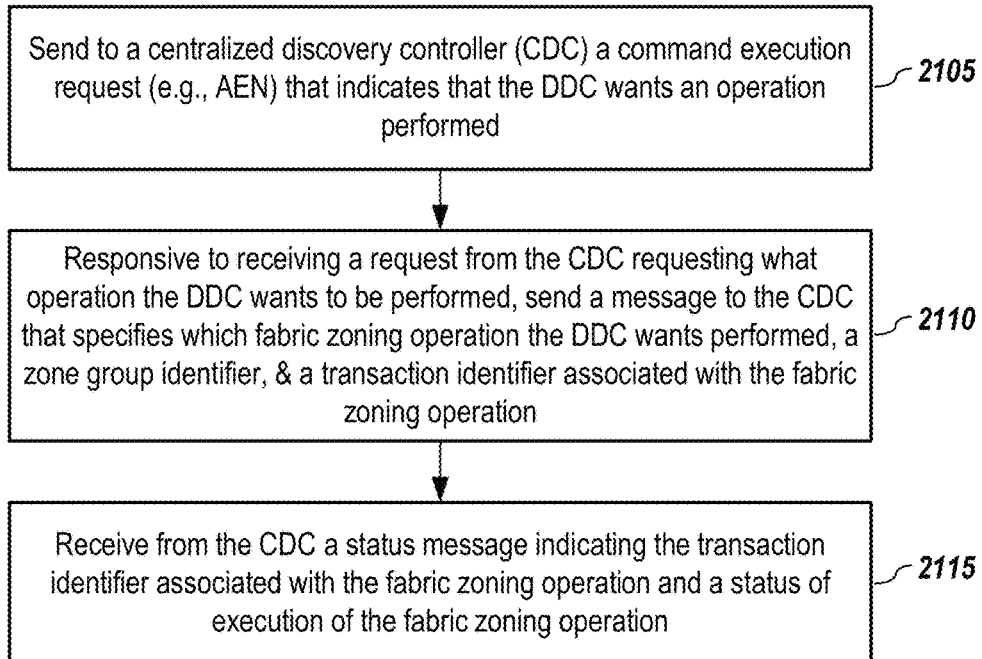
FIG. 21 depicts general direct discovery controller (DDC) functions for various operations in a pull model environment, according to embodiments of the present disclosure.

FIG. 21 depicts general DDC functions for various operations in a pull model environment, according to embodiments of the present disclosure. In one or more embodiments, the CDC sends (2105) to a CDC a command execution request (e.g., via an AEN) that indicates that the DDC wants to perform an operation. Responsive to receiving a request from the CDC that requests of the CDC which operation the DDC wants performed, the DDC sends (2110) information to the CDC that specifies which fabric zoning operation the DDC wants performed, a zone group identifier, and a transaction identifier associated with the fabric zoning operation. After the CDC completes the operation, the DDC may receive (2115) from the CDC a status message indicating the transaction identifier associated with the fabric zoning operation and a status of execution of the fabric zoning operation. Note that the DDC may use the transaction identifier to correlate the status information to the operation the DDC wanted to be performed. Also, in one or more embodiments, the DDC may receive another AER from the CDC so that the DDC may send an AEN when it wants another operation performed.

3. Host Discovery/Send Log Page Command Embodiments

Figure 22:
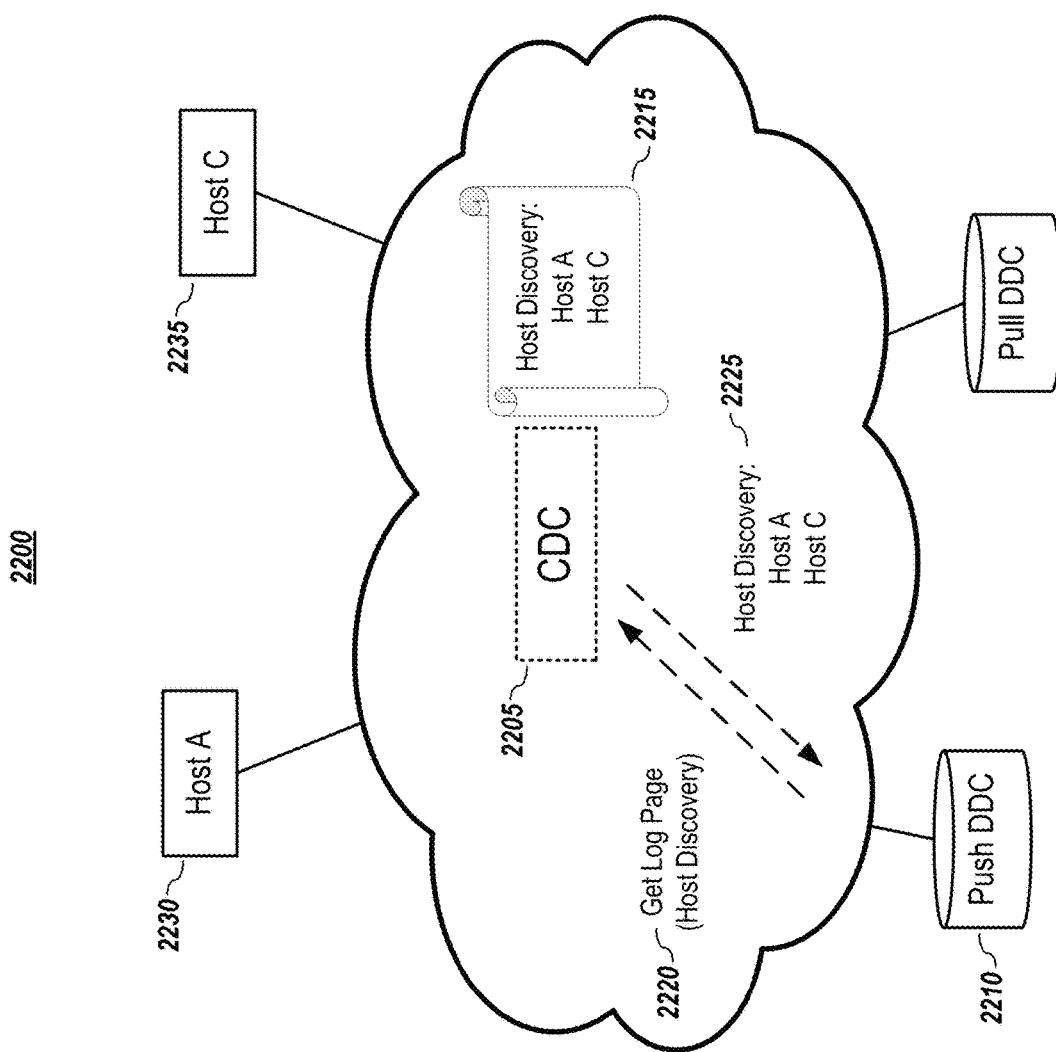
FIGS. 22-24 graphically depict the host discovery processes for a push model.
Figure 23:
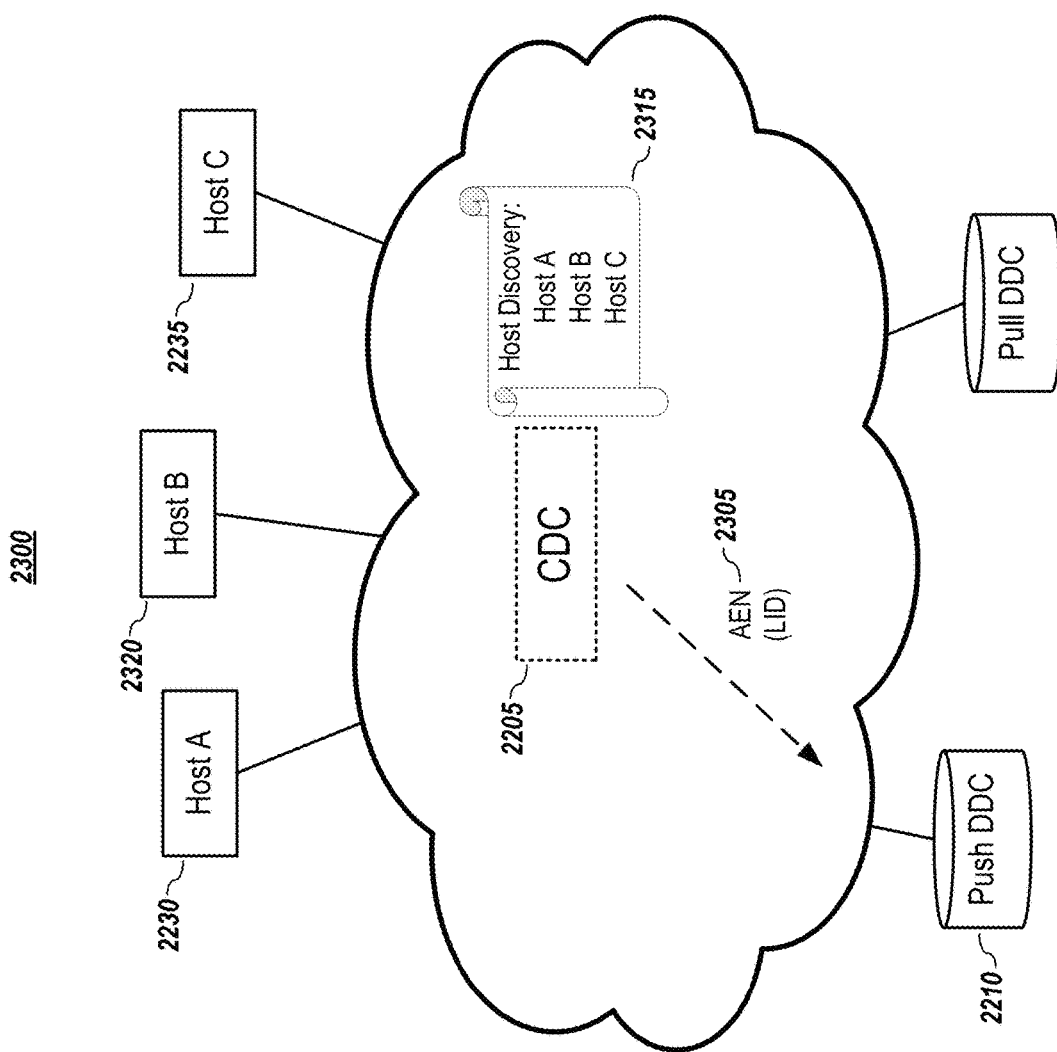
Figure 24:
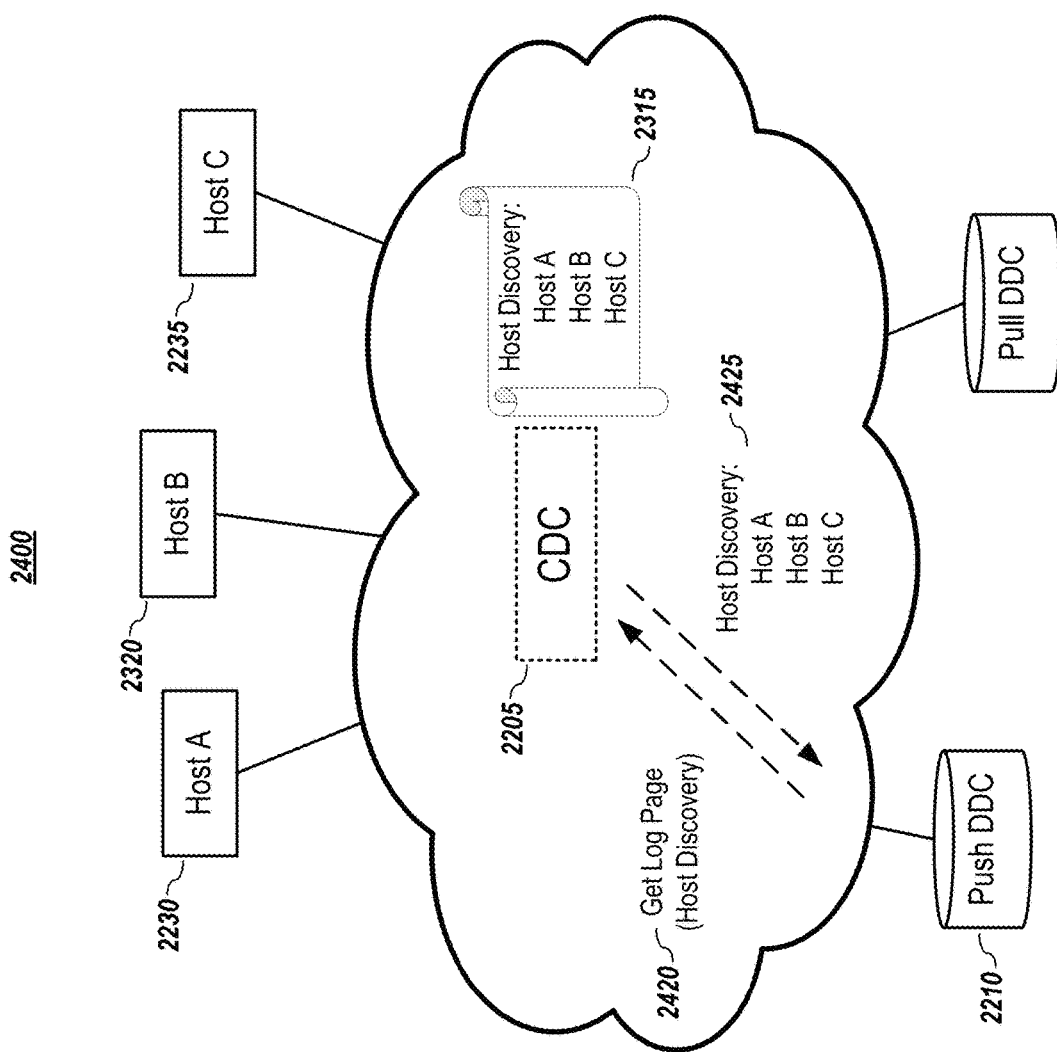
Figure 25:
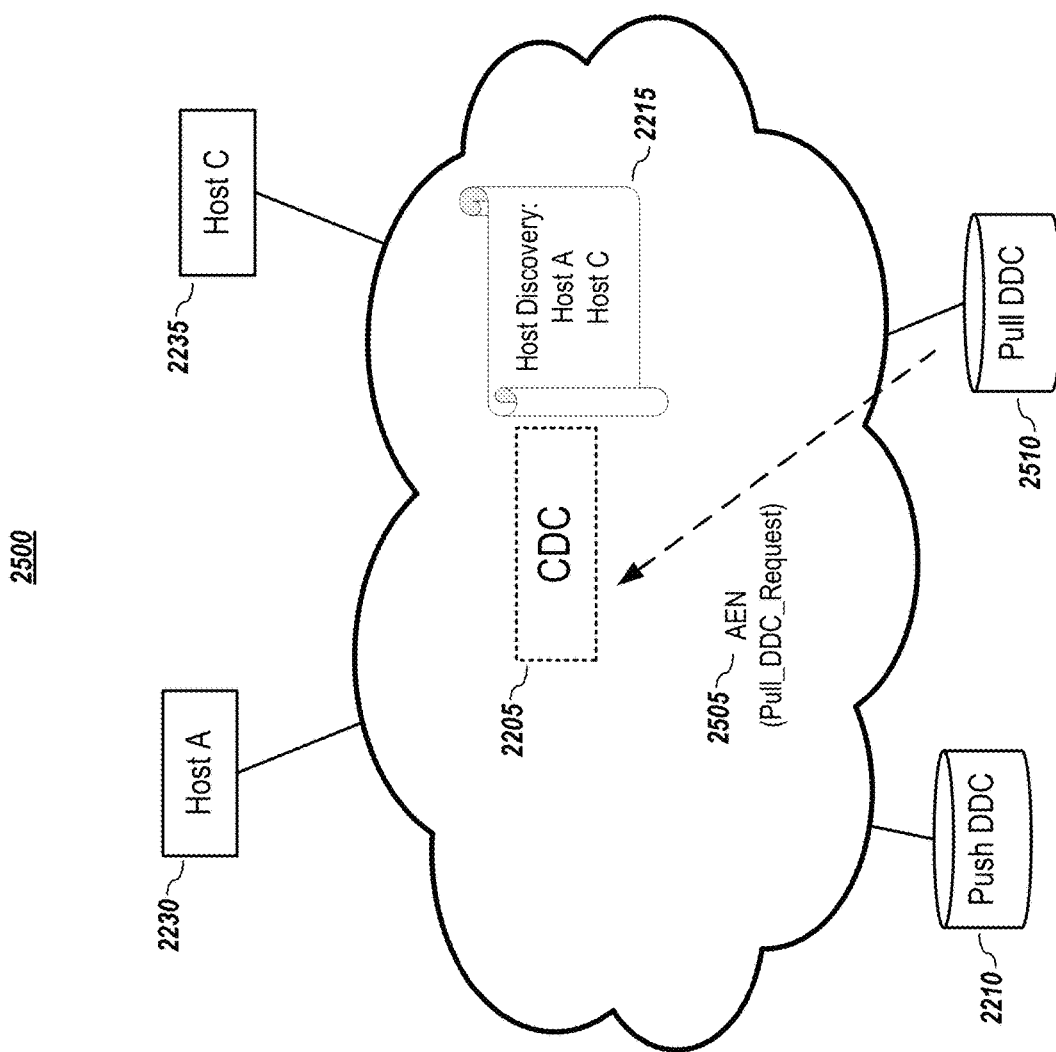
FIGS. 25-28 graphically depict pull model DDC methodologies from obtain information from a CDC, according to embodiments of the present disclosure.

As noted previously, push model DDCs have the ability to initiate actions that pull model DDCs cannot. Consider, by way of illustration, the host discovery activities for a push model DDC, which are depicted in FIGS. 22-24. As shown in FIG. 22, a push model DDC 2210 can send a GLP request 2220 for host discovery to a CDC 2205. In the depicted example, two hosts (Host A 2230 and Host C 2235) have registered or been registered 2215 with the CDC 2205. Upon receipt of the GLP 2220, the CDC returns 2225 the host discovery information 2225 as the contents of the Host Discovery Log Page. Thus, a push model DDC can retrieve a Host Discovery Log Page 2225 by directly issuing 2220 a Get Log Page command.

Similarly, if a new host is added, the push model DDC can request the updated host information. Consider, by way of illustration, FIGS. 23 and 24. In FIG. 23, host B 2320 is added to the network and registers or is registered 2315 with the CDC 2205. The CDC notifies 2305 the DDC 2210 via an AEN for a Host Discovery Log Page using a specific Log Page Identifier (LID) (e.g., 71h) to notify the DDC to request the appropriate information. As shown in FIG. 24, the push model DDC 2210 may retrieve the updated Host Discovery Log Page 2425 by issuing another Get Log Page 2420 to the CDC.

The interactions in FIGS. 22-24 are possible given the push nature of the DDC. However, they are not possible for a pull model DDC; but, given a command execution request embodiment as discussed in Section C.1. (above), a pull model DDC may use the command execution request framework for host discovery or to obtain other information from the CDC.

Figure 26:
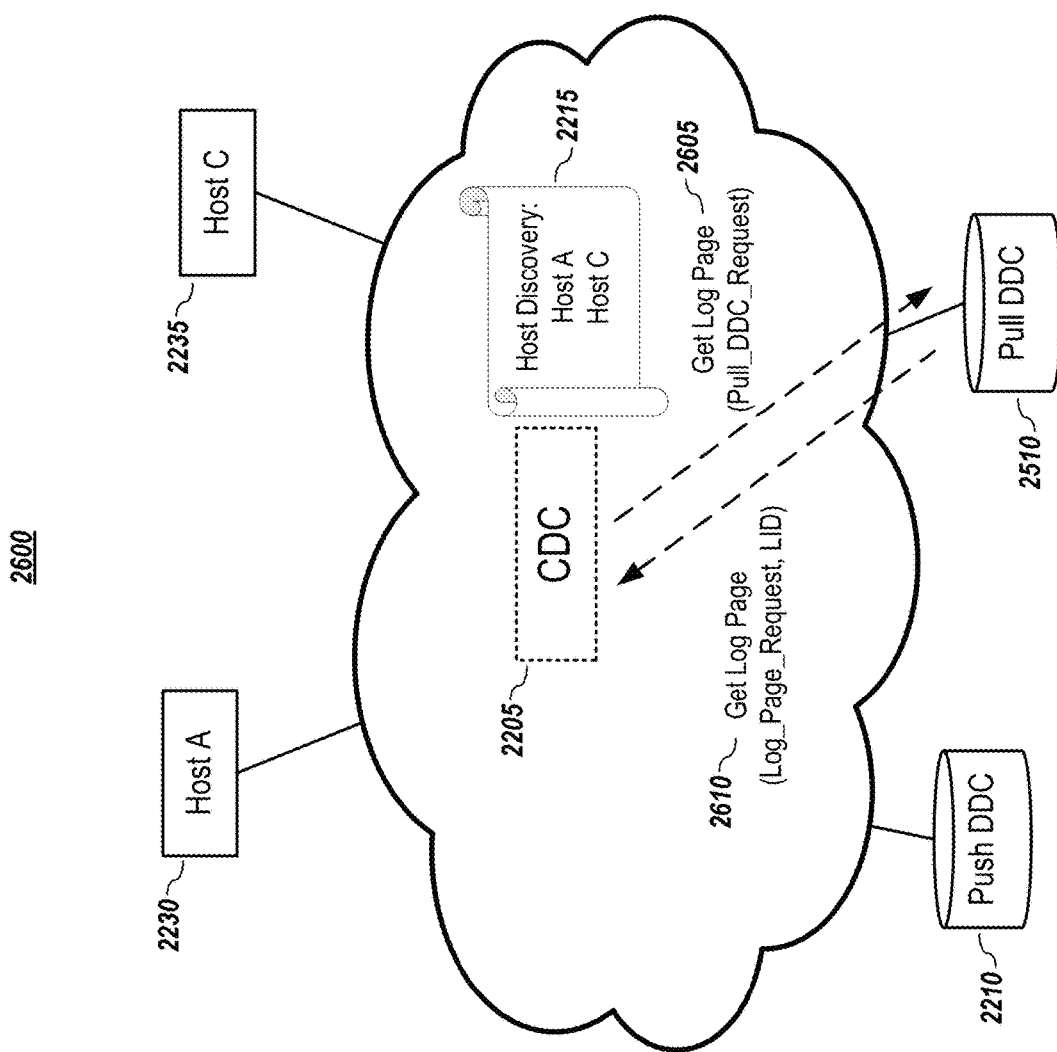
Figure 27:
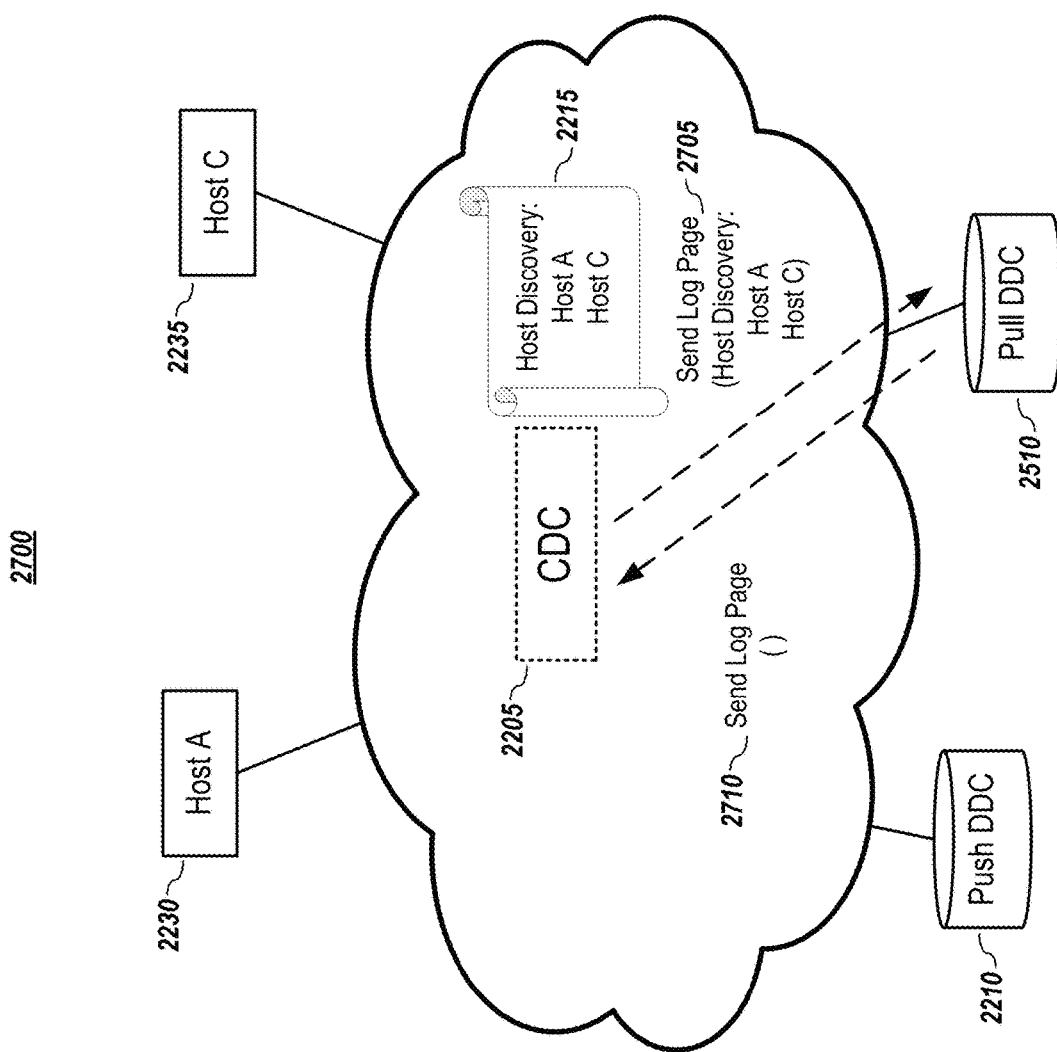

FIGS. 25-28 graphically depict pull model DDC methodologies for obtaining information from a CDC, according to embodiments of the present disclosure. Starting with FIG. 25, a pull model DDC 2510 may initiate the process to retrieve a Host Discovery Log Page by issuing a Pull_DDC_Request AEN 2505 to the CDC 2205. Turning to FIG. 26, the CDC issues (2605) a Get Log Page requesting the Pull_DDC_Request Log Page, and the DDC 2510 replies (2610) with the contents of that Log Page. Said Log Page contents request a Log_Page_Request operation for the Host Discovery Log Page by identifying the operation and the request log page identifier (e.g., LID=71h). In FIG. 27, the CDC 2205 issues (2705) a Send Log Page command carrying the Host Discovery Log Page. The DDC may respond (2710) indicating the status of its receipt of the Send Log Page 2705.

Figure 28:
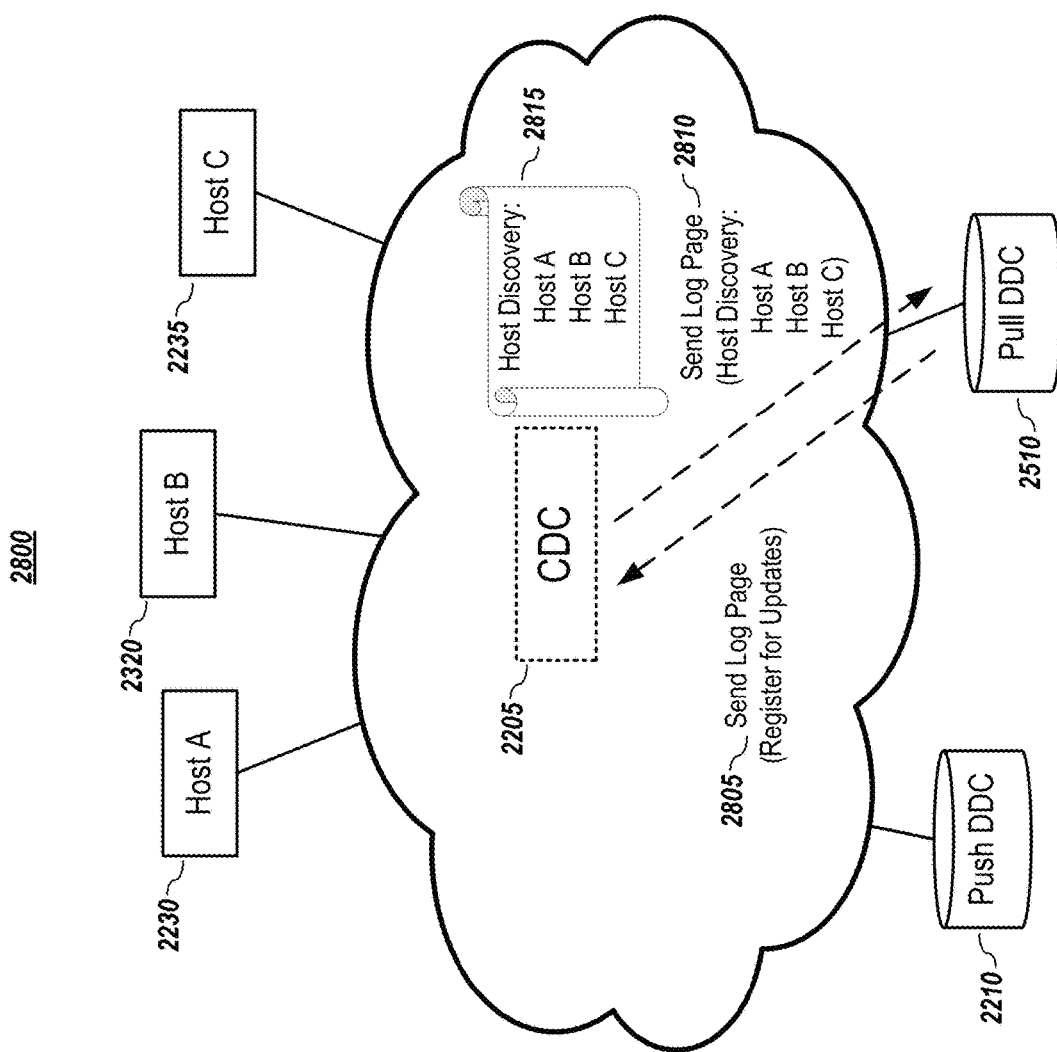

This framework may also be used for updates to host discovery information. A problem in the pull model environment is that the CDC has to issue an unsolicited Send Log Page command carrying the updated Log Page contents. In one or more embodiments, this behavior may be controlled by the pull model DDC through a "Register for Log Page Updates" flag in the Send Log Page CQE. FIG. 28 graphically illustrates such a process. As depicted, in a Send Log Page communication, the pull DDC 2505 may register (2805) for updates related to the hosts. When host B 2320 is added, the CDC 2205, knowing that the pull DDC 2505 registered to be informed of updated host information, will send 2810 a Send Log Page with the host discovery information to the pull DDC.

Figure 29:
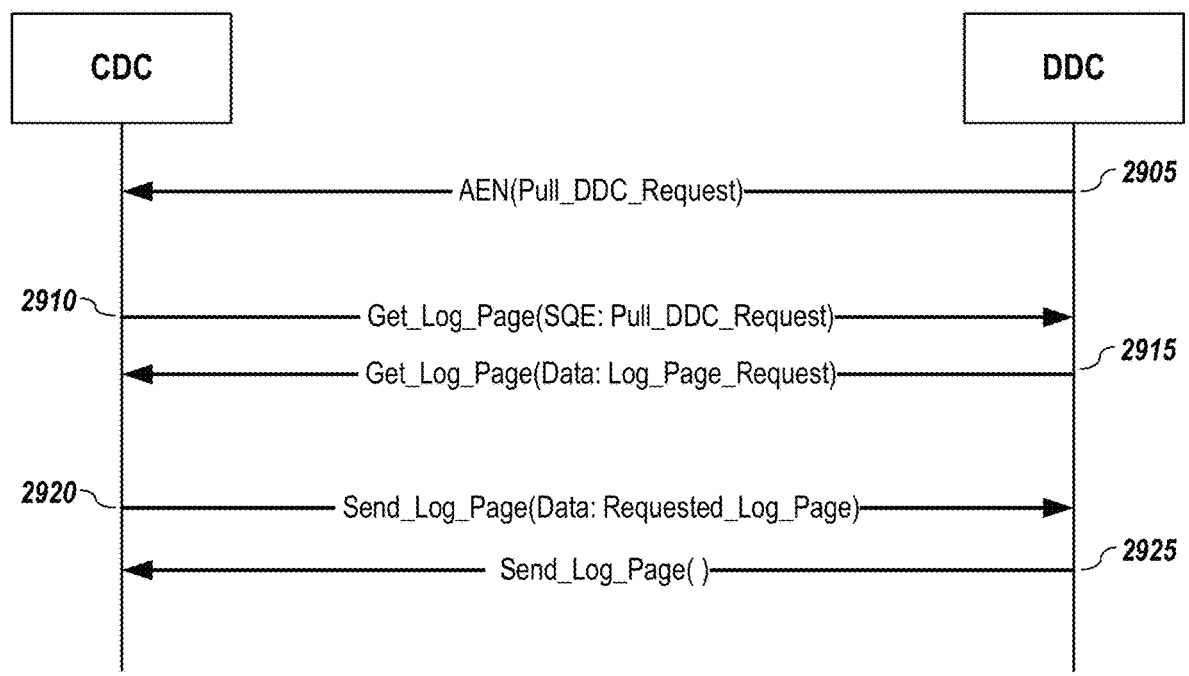
FIG. 29 depicts a general methodology for host discovery for a pull DDC, according to embodiments of the present disclosure.

FIG. 29 depicts a general methodology for host discovery for a pull DDC, according to embodiments of the present disclosure. As depicted, a pull model DDC may request a Host Discovery list through a Pull DDC Request asynchronous event notification (2905). As mentioned above, this AEN includes a notice event to indicate that a pull model DDC is requesting the CDC to perform an operation. In one or more embodiments, the CDC responds (2910) to that AEN with a Get Log Page command requesting a Pull DDC Request Log Page, to which the DDC responds (2915) with a Log Page whose contents request a Log Page Request operation.

In one or more embodiments, the format of the operation specific parameters of a Pull DDC Request Log Page requesting a Log Page Request operation may be as follows:

| Bytes | Description |
| --- | --- |
| 00 | Log Page Request Log Page Identifier (LPRLID) |
| 01 | Log Page Request Log Specific Field (LPRLSP) |
| 03:02 | <reserved> |

In one or more embodiments, the LPRLID and LPRLSP fields may use respectively the same format and semantics of the Log Page Identifier (LID) field (this field specifies the identifier of the log page to retrieve) and Log Specific Field (LSP) field (if not defined for the log specified by the LID field, this field may be reserved) of a Get Log Page command. To retrieve the Host Discovery list, the LPRLID field may be set to a pre-defined value (e.g., 71h).

In one or more embodiments, the Log Page Request operation may be completed by the CDC by issuing a Send Log Page command (2920) to provide the requested Log Page to the pull model DDC.

In one or more embodiments, the transferred Log Page may use the same format of the correspondent Log Page retrieved by a Get Log Page command.

As noted previously, for updates, the pull model DDC receiving the Send Log Page command may request in advance for the CDC to resend the requested Log Page when that Log Page is updated on the CDC. In one or more embodiments, this update may be requested by setting a bit (e.g., bit 31) of the Send Log Page CQE (2925) to indicate Log Page Update Registration (LPUR). That is, this bit specifies whether the CDC should resend the requested Log Page when that Log Page is updated on the CDC. If the bit is set to a first value (e.g., "1"), the CDC issues to the requesting pull model DDC a Send Log Page command carrying the requested Log Page when that Log Page is updated on the CDC. If the bit is set to a second value (e.g., "0"), the CDC does not issue a Send Log Page command carrying the requested Log Page when that Log Page is updated on the CDC.

FIG. 30 depicts an alternative methodology of CDC functions for host discovery in a pull model environment, according to embodiments of the present disclosure. In one or more embodiments, responsive to the CDC receiving a notification (e.g., AEN) from a DDC of a storage subsystem indicating that a pull model DDC is requesting the CDC to perform an operation, the CDC responds (3005) by sending a request (e.g., GLP) to the DDC requesting a Log Page Request (e.g., Pull DDC Request Log Page) that identifies an operation that the DDC wants performed. It should be noted that not depicted in FIG. 30, the CDC may previously have sent an Asynchronous Event Request (AER) command to receive a notice from the DDC. The CDC receives (3010) a response (e.g., a GLP response) from the DDC, in which the response is a Log Page requesting a Log Page Request operation and includes one or more operation specific parameters associated with the requested Log Page Request operation. The CDC performs (3015) one or more actions related to the operation (e.g., read the host discovery information from a datastore) and issues (3020) a Send Log Page command to provide the requested Log Page to the DDC.

Figure 31:
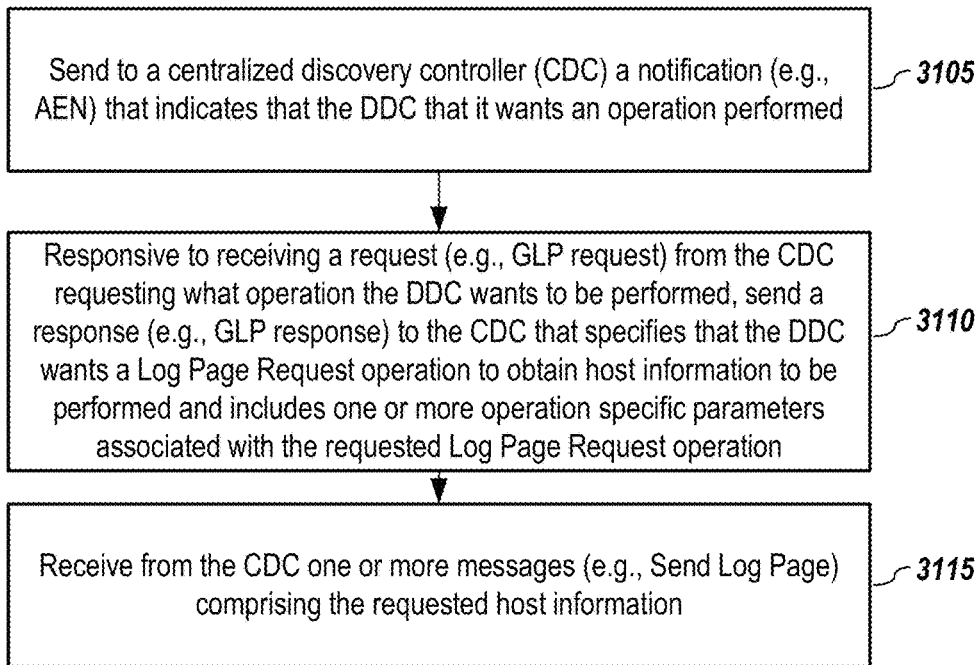
FIG. 31 depicts an alternative methodology of DDC functions for host discovery in a pull model environment, according to embodiments of the present disclosure.

FIG. 31 depicts an alternative methodology of DDC functions for host discovery in a pull model environment, according to embodiments of the present disclosure. In one or more embodiments, the DDC sends (3105) a notification (e.g., AEN) to a CDC that indicates that the DDC that it wants an operation performed. Responsive to receiving a request (e.g., GLP request) from the CDC requesting what operation the DDC wants performed, the DDC sends (3110) a response (e.g., GLP response) to the CDC that specifies that the DDC wants a Log Page Request operation to obtain host information to be performed and includes one or more operation specific parameters associated with the requested Log Page Request operation. The CDC obtains the requested host discovery information, and the DDC receives (3115) from the CDC one or more responses (e.g., Send Log Page command(s)) comprising the requested host information. While not depicted, in FIG. 31, in responding to the Send Log Page, the DDC may indicate to the CDC that the DDC wants updates sent to it if information changes.

D. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 32:
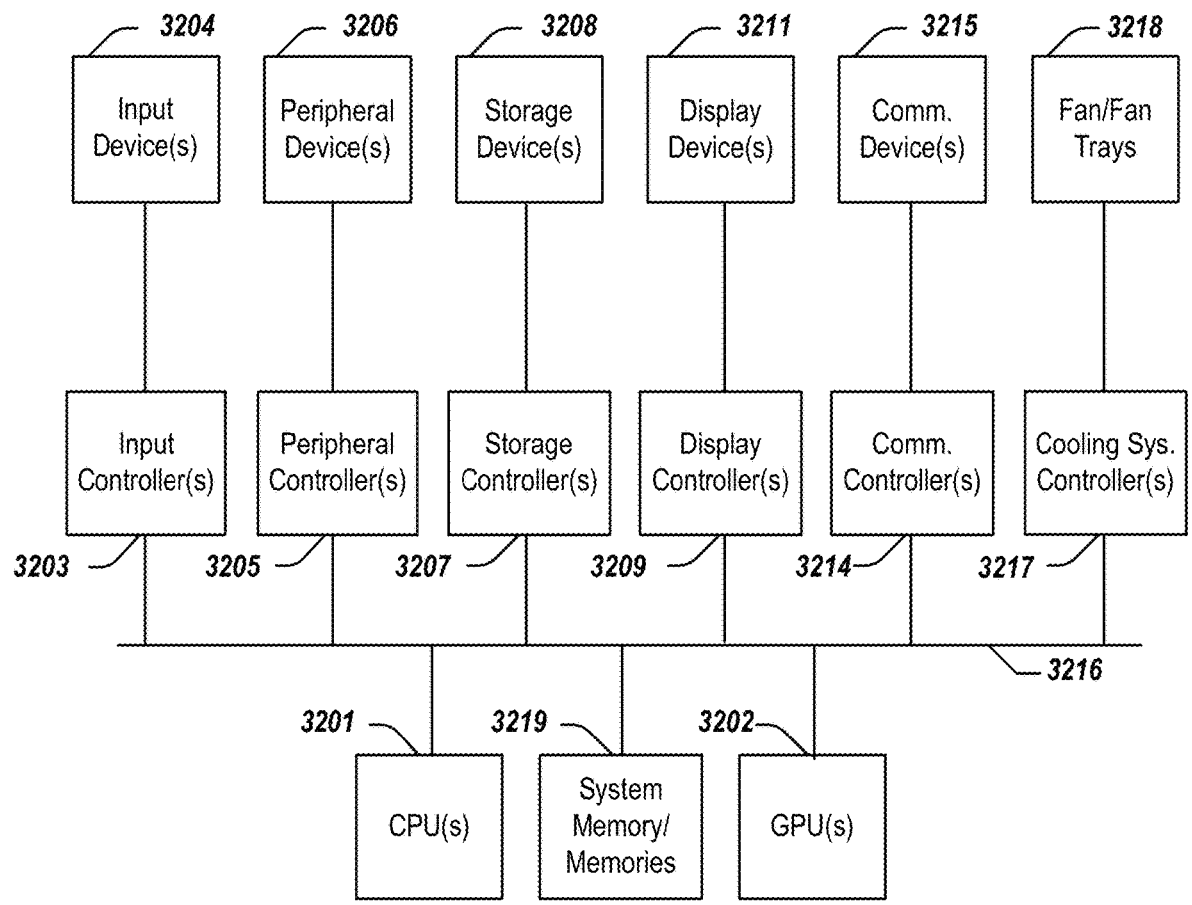
FIG. 32 depicts a simplified block diagram of an information handling system, according to embodiments of the present disclosure.

FIG. 32 depicts a simplified block diagram of an information handling system (or computing system), according to embodiments of the present disclosure. It will be understood that the functionalities shown for system 3200 may operate to support various embodiments of a computing system—although it shall be understood that a computing system may be differently configured and include different components, including having fewer or more components as depicted in FIG. 32.

As illustrated in FIG. 32, the computing system 3200 includes one or more CPUs 3201 that provides computing resources and controls the computer. CPU 3201 may be implemented with a microprocessor or the like and may also include one or more graphics processing units (GPU) 3202 and/or a floating-point coprocessor for mathematical computations. In one or more embodiments, one or more GPUs 3202 may be incorporated within the display controller 3209, such as part of a graphics card or cards. The system 3200 may also include a system memory 3219, which may comprise RAM, ROM, or both.

A number of controllers and peripheral devices may also be provided, as shown in FIG. 32. An input controller 3203 represents an interface to various input device(s) 3204, such as a keyboard, mouse, touchscreen, stylus, microphone, camera, trackpad, display, etc. The computing system 3200 may also include a storage controller 3207 for interfacing with one or more storage devices 3208 each of which includes a storage medium such as magnetic tape or disk, or an optical medium that might be used to record programs of instructions for operating systems, utilities, and applications, which may include embodiments of programs that implement various aspects of the present disclosure. Storage device(s) 3208 may also be used to store processed data or data to be processed in accordance with the disclosure. The system 3200 may also include a display controller 3209 for providing an interface to a display device 3211, which may be a cathode ray tube (CRT) display, a thin film transistor (TFT) display, organic light-emitting diode, electroluminescent panel, plasma panel, or any other type of display. The computing system 3200 may also include one or more peripheral controllers or interfaces 3205 for one or more peripherals 3206. Examples of peripherals may include one or more printers, scanners, input devices, output devices, sensors, and the like. A communications controller 3214 may interface with one or more communication devices 3215, which enables the system 3200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 3200 comprises one or more fans or fan trays 3218 and a cooling subsystem controller or controllers 3217 that monitors thermal temperature(s) of the system 3200 (or components thereof) and operates the fans/fan trays 3218 to help regulate the temperature.

In the illustrated system, all major system components may connect to a bus 3216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 33:
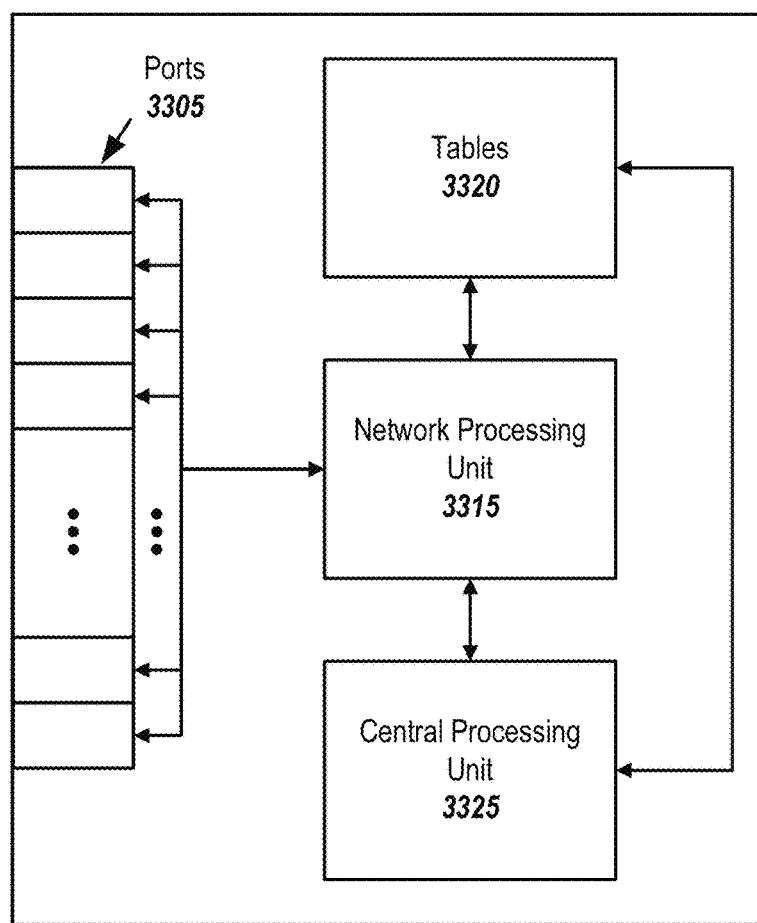
FIG. 33 depicts an alternative block diagram of an information handling system, according to embodiments of the present disclosure.

FIG. 33 depicts an alternative block diagram of an information handling system, according to embodiments of the present disclosure. It will be understood that the functionalities shown for system 3300 may operate to support various embodiments of the present disclosure—although it shall be understood that such system may be differently configured and include different components, additional components, or fewer components.

The information handling system 3300 may include a plurality of I/O ports 3305, a network processing unit (NPU) 3315, one or more tables 3320, and a CPU 3325. The system includes a power supply (not shown) and may also include other components, which are not shown for sake of simplicity.

In one or more embodiments, the I/O ports 3305 may be connected via one or more cables to one or more other network devices or clients. The network processing unit 3315 may use information included in the network data received at the node 3300, as well as information stored in the tables 3320, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method comprising:
   responsive to a centralized discovery controller (CDC) receiving a command execution request from a direct discovery controller (DDC) of a storage subsystem indicating that the DDC wants an operation performed, sending a request to the DDC requesting what operation the DDC wants to be performed;
   receiving an indication from the DDC that specifies which operation the DDC wants performed and including one or more operation specific parameters associated with the requested operation; and
   issuing one or more commands related to the requested operation.

2. The processor-implemented method of claim 1 wherein the step of issuing one or more commands related to the requested operation comprises:
   sending a status message to the DDC indicating a status of execution of the operation.

3. The processor-implemented method of claim 2 wherein the status message includes a transaction identifier associated with the operation.

4. The processor-implemented method of claim 2 further comprising:
   performing one or more actions related to the operation prior to sending the status message.

5. The processor-implemented method of claim 1 wherein the operation allows the DDC to obtain information from the CDC about a zone group associated with the DDC, to obtain information from the CDC about one or more hosts, or to change information about a zone group associated with the DDC.

6. The processor-implemented method of claim 1 wherein the command execution request from a direct discovery controller (DDC) comprising an asynchronous event notification that comprises a pull device request identifier that indicates to the CDC to send a specific type of Get Log Page to the DDC.

7. The processor-implemented method of claim 6 wherein the indication received from the DDC that specifies which operation the DDC wants performed is a Get Log Page response that comprises an identifier of the operation and one or more operation specific parameters.

8. The processor-implemented method of claim 1 further comprising the step of:
   sending to the DDC an event request command to subscribe to receive a notice from the DDC to facilitate receipt of the command execution request from the DDC.

9. An information handling system operating as a centralized discovery controller (CDC), comprising:
   one or more processors; and
   a non-transitory computer-readable medium or media comprising one or more sets of instructions which, when executed by at least one of the one or more processors, causes steps to be performed comprising:
      responsive to a centralized discovery controller (CDC) receiving a command execution request from a direct discovery controller (DDC) of a storage subsystem indicating that the DDC wants an operation performed, sending a request to the DDC requesting what operation the DDC wants to be performed;
      receiving an indication from the DDC that specifies which operation the DDC wants performed and including one or more operation specific parameters associated with the requested operation; and
      issuing one or more commands related to the requested operation.

10. The information handling system of claim 9 wherein the step of issuing one or more commands related to the requested operation comprises:
    sending a status message to the DDC indicating a status of execution of the operation.

11. The information handling system of claim 10 wherein the status message includes a transaction identifier associated with the operation.

12. The information handling system of claim 10 wherein the non-transitory computer-readable medium or media further comprises one or more sequences of instructions which, when executed by at least one of the one or more processors, causes steps to be performed comprising:
performing one or more actions related to the operation prior to sending the status message.

13. The information handling system of claim 9 wherein the operation allows the DDC to obtain information from the CDC about a zone group associated with the DDC, to obtain information from the CDC about one or more hosts, or to change information about a zone group associated with the DDC.

14. The information handling system of claim 9 wherein the command execution request from a direct discovery controller (DDC) comprising an asynchronous event notification that comprises a pull device request identifier that indicates to the CDC to send a specific type of Get Log Page to the DDC.

15. The information handling system of claim 14 wherein the indication received from the DDC that specifies which operation the DDC wants performed is a Get Log Page response that comprises an identifier of the operation and one or more operation specific parameters.

16. A processor-implemented method comprising:
sending, from a direct discovery controller (DDC) of a storage subsystem to a centralized discovery controller (CDC), a command execution request that indicates that the DDC wants an operation performed;
responsive to receiving a request from the CDC requesting what operation the DDC wants to be performed, sending a message to the CDC that specifies which operation the DDC wants performed and one or more operation specific parameters; and
receiving from the CDC a status message indicating a status of execution of the operation.

17. The processor-implemented method of claim 16 further comprising:
receiving from the CDC an event request command to subscribe to receive a notice from the DDC to facilitate receipt of the command execution request from the DDC.

18. The processor-implemented method of claim 16 wherein the DDC using the command execution request to command execution request to obtain information from the CDC about a host, about a zone group associated with the DDC, or to change information about a zone group associated with the DDC.

19. The processor-implemented method of claim 16 wherein at least one of the one or more operation specific parameters is a transaction identifier.

20. The processor-implemented method of claim 19 wherein the DDC uses the transaction identifier to correlate status information to the operation.

* * * * *